United States Patent
Kolk

(10) Patent No.: US 10,782,032 B2
(45) Date of Patent: Sep. 22, 2020

(54) CONTROLLER FOR AUTOMATIC CONTROL OF DUTY CYCLED HVACR EQUIPMENT, AND SYSTEMS AND METHODS USING SAME

(71) Applicant: PaceControls, LLC, Philadelphia, PA (US)

(72) Inventor: Richard Kolk, Philadelphia, PA (US)

(73) Assignee: PACECONTROLS, LLC, Philadelphia, PA (US)

( * ) Notice: Subject to any disclaimer, the term of this patent is extended or adjusted under 35 U.S.C. 154(b) by 0 days.

(21) Appl. No.: 14/775,749

(22) PCT Filed: Mar. 14, 2014

(86) PCT No.: PCT/US2014/027152
§ 371 (c)(1),
(2) Date: Sep. 14, 2015

(87) PCT Pub. No.: WO2014/152276
PCT Pub. Date: Sep. 25, 2014

(65) Prior Publication Data
US 2016/0018126 A1  Jan. 21, 2016

Related U.S. Application Data

(60) Provisional application No. 61/799,804, filed on Mar. 15, 2013.

(51) Int. Cl.
*F24D 19/10* (2006.01)
*G05D 23/19* (2006.01)
(Continued)

(52) U.S. Cl.
CPC .............. *F24D 19/10* (2013.01); *F24F 11/30* (2018.01); *F24F 11/62* (2018.01); *F24F 11/70* (2018.01);
(Continued)

(58) Field of Classification Search
CPC .... F24F 11/006; F24F 11/001; F24F 11/0076; F24F 11/30; F24F 11/46; F24F 11/59;
(Continued)

(56) References Cited

U.S. PATENT DOCUMENTS

| 3,478,808 A | * 11/1969 | Adams ................... B22D 11/16 164/454 |
| 4,349,879 A | 9/1982 | Peddie et al. |

(Continued)

FOREIGN PATENT DOCUMENTS

| CN | 101600916 A | 12/2009 |
| JP | 2003307331 A | 10/2003 |

(Continued)

OTHER PUBLICATIONS

Office Action received in corresponding Chinese Patent Application No. 201480028491.9 dated Oct. 18, 2016 (in Chinese with English translation attached)(26 pages).

(Continued)

*Primary Examiner* — Jennifer L Norton
(74) *Attorney, Agent, or Firm* — Kilyk & Bowersox, P.L.L.C.

(57) ABSTRACT

An electronic controller device for automatic control of a heating, ventilating, air conditioning or refrigeration (HVACR) system, which has at least a delayed start controller that is capable of delaying sending of a signal to power on a load unit and achieve a selected conditioned space temperature variation, and a demand regulator controller that is capable of calculating on times and off times to obtain a selected electrical demand. The electronic controller device can include a computer-readable storage medium that comprises programs to implement the delayed start and demand regulator controllers, and optionally other controller modules, can delay OEM ON signals and/or (Continued)

adjust the "on" and "off" states, and/or provide other load unit control, to manage and reduce energy consumption and/or demand.

14 Claims, 26 Drawing Sheets

(51) Int. Cl.
| | |
|---|---|
| *F24F 11/30* | (2018.01) |
| *F24F 11/70* | (2018.01) |
| *F24F 11/62* | (2018.01) |
| *G05B 15/02* | (2006.01) |
| F24F 110/00 | (2018.01) |
| F24F 11/65 | (2018.01) |
| F24F 11/46 | (2018.01) |
| F24F 11/64 | (2018.01) |
| F24F 11/61 | (2018.01) |
| F24F 11/63 | (2018.01) |
| F24F 11/59 | (2018.01) |
| F24F 140/60 | (2018.01) |

(52) U.S. Cl.
CPC ......... *G05B 15/02* (2013.01); *G05D 23/1919* (2013.01); *F24F 11/46* (2018.01); *F24F 11/59* (2018.01); *F24F 11/61* (2018.01); *F24F 11/63* (2018.01); *F24F 11/64* (2018.01); *F24F 11/65* (2018.01); *F24F 2110/00* (2018.01); *F24F 2140/60* (2018.01)

(58) Field of Classification Search
CPC .. F24F 11/61; F24F 11/62; F24F 11/63; F24F 11/64; F24F 11/65; F24F 11/70; F24F 2110/00; F24F 2140/60; F24D 19/10; G05B 15/02; G05D 23/1919
See application file for complete search history.

(56) References Cited

U.S. PATENT DOCUMENTS

| | | | | |
|---|---|---|---|---|
| 4,476,423 | A | * | 10/1984 | Mallick, Jr. .......... H02H 7/0816 318/782 |
| 4,847,781 | A | | 7/1989 | Brown, III et al. |
| 4,977,515 | A | | 12/1990 | Rudden et al. |
| 5,037,291 | A | * | 8/1991 | Clark ...................... F23N 5/082 431/12 |
| 5,168,170 | A | | 12/1992 | Hartig |
| 5,198,809 | A | | 3/1993 | Day |
| 5,203,179 | A | | 4/1993 | Powell |
| 5,231,565 | A | | 7/1993 | Bilas et al. |
| 5,253,159 | A | | 10/1993 | Bilas et al. |
| 5,261,247 | A | | 11/1993 | Knezic et al. |
| 5,308,958 | A | | 5/1994 | Gassho |
| 5,323,307 | A | | 6/1994 | Wolf et al. |
| 5,426,620 | A | | 6/1995 | Budney |
| 5,455,469 | A | | 10/1995 | Ward |
| 5,455,760 | A | | 10/1995 | Bilas et al. |
| 5,543,666 | A | | 8/1996 | Priesemuth |
| 5,563,459 | A | | 10/1996 | Kurosawa et al. |
| 5,611,484 | A | | 3/1997 | Uhrich |
| 5,615,829 | A | | 4/1997 | Porter |
| 5,625,236 | A | | 4/1997 | Lefebvre et al. |
| 5,654,593 | A | | 8/1997 | Murata |
| 5,669,222 | A | | 9/1997 | Jaster et al. |
| 5,687,139 | A | | 11/1997 | Budney |
| 5,735,134 | A | | 4/1998 | Liu et al. |
| 5,761,083 | A | | 6/1998 | Brown, Jr. et al. |
| 5,953,226 | A | | 9/1999 | Mellish et al. |
| 5,996,361 | A | | 12/1999 | Bessler et al. |
| 6,179,213 | B1 | * | 1/2001 | Gibino .................. F24F 11/006 165/238 |
| 6,196,468 | B1 | | 3/2001 | Young |
| 6,528,957 | B1 | | 3/2003 | Luchaco |
| 6,658,373 | B2 | | 12/2003 | Rossi et al. |
| 6,675,591 | B2 | | 1/2004 | Singh et al. |
| 6,737,761 | B2 | | 5/2004 | Ishida et al. |
| 6,799,091 | B2 | | 9/2004 | Bradford |
| 6,832,135 | B2 | | 12/2004 | Ying |
| 6,946,626 | B2 | | 9/2005 | Hirayama et al. |
| 6,975,926 | B2 | | 12/2005 | Schanin |
| 7,010,363 | B2 | | 3/2006 | Donnelly et al. |
| 7,055,759 | B2 | | 6/2006 | Wacker et al. |
| 7,076,673 | B2 | | 7/2006 | Yoshikawa |
| 7,110,832 | B2 | | 9/2006 | Ghent |
| 7,149,605 | B2 | | 12/2006 | Chassin et al. |
| 7,152,415 | B2 | | 12/2006 | Micak et al. |
| 7,167,348 | B2 | * | 1/2007 | Knox, Jr. ............. H01R 9/2641 361/20 |
| 7,177,728 | B2 | | 2/2007 | Gardner |
| 7,242,114 | B1 | | 7/2007 | Cannon et al. |
| 7,264,175 | B2 | | 9/2007 | Schwendinger et al. |
| 7,394,217 | B2 | | 7/2008 | Marando |
| 7,595,567 | B1 | | 9/2009 | Cannon et al. |
| 7,809,472 | B1 | | 10/2010 | Silva et al. |
| 2001/0048030 | A1 | | 12/2001 | Sharood et al. |
| 2003/0225483 | A1 | | 12/2003 | Santinato et al. |
| 2005/0038571 | A1 | | 2/2005 | Brickfield et al. |
| 2005/0087616 | A1 | * | 4/2005 | Attridge .................. F24F 3/044 236/91 D |
| 2005/0194455 | A1 | * | 9/2005 | Alles ..................... F24F 3/0442 236/1 B |
| 2005/0240312 | A1 | | 10/2005 | Terry et al. |
| 2005/0273183 | A1 | | 12/2005 | Curt et al. |
| 2007/0082311 | A1 | | 4/2007 | Yamaguchi et al. |
| 2008/0083834 | A1 | | 4/2008 | Krebs et al. |
| 2008/0215263 | A1 | | 9/2008 | Flohr |
| 2009/0164393 | A1 | | 6/2009 | Takano et al. |
| 2009/0234511 | A1 | | 9/2009 | Ouchi et al. |
| 2009/0320505 | A1 | * | 12/2009 | Van Dijck ............ B01D 53/265 62/89 |
| 2010/0100246 | A1 | | 4/2010 | Josserand et al. |
| 2010/0282857 | A1 | * | 11/2010 | Steinberg ............... F24F 11/006 236/49.3 |
| 2010/0298988 | A1 | * | 11/2010 | Stachler ............. H01R 13/6456 700/276 |
| 2012/0047921 | A1 | | 3/2012 | Besore |
| 2012/0053749 | A1 | * | 3/2012 | Ontiveros ................. H02J 1/14 700/296 |
| 2014/0052300 | A1 | * | 2/2014 | Matsuoka ............ F24F 11/0086 700/276 |
| 2015/0176854 | A1 | * | 6/2015 | Butler .................. F24F 11/0009 700/278 |

FOREIGN PATENT DOCUMENTS

| | | |
|---|---|---|
| JP | 2005003329 A | 1/2005 |
| WO | 2011062942 A1 | 5/2011 |
| WO | 2014144175 A1 | 9/2014 |

OTHER PUBLICATIONS

International Search Report and Written Opinion issued in corresponding International Patent Application No. PCT/US2014/027152 dated Jul. 17, 2014 (13 pages).

Extended European Search Report received in corresponding European Patent Application No. 14769015.0 dated Oct. 25, 2016 (10 pages).

\* cited by examiner

Cooling With Electric Heating

Heat Pump With Electric Heating

US 10,782,032 B2

CONTROLLER FOR AUTOMATIC CONTROL OF DUTY CYCLED HVACR EQUIPMENT, AND SYSTEMS AND METHODS USING SAME

This application is a National Stage Application of PCT/US2014/027152, filed Mar. 14, 2014, which claims the benefit under 35 U.S.C. § 119(e) of prior U.S. Provisional Patent Application No. 61/799,804, filed Mar. 15, 2013, which is incorporated in its entirety by reference herein.

BACKGROUND OF THE INVENTION

The present invention relates to an electronic controller for automatically controlling and optimizing duty cycled, electrical energy-consuming equipment, including compressor and/or gas-, oil-, and propane-fired heating equipment with or without blowers controlled via electrically powered control systems. The present invention also relates to heating, ventilating, air conditioning, and refrigeration equipment systems incorporating the electronic controller and methods of using the controller in such systems.

Heating, ventilating, air conditioning and/or refrigeration ("HVAC&R" or "HVACR") control systems have been designed to perform two major functions: temperature regulation and dehumidification. Compressors and blowers used in these systems typically operate with electrically-powered motors. Increased focus on carbon footprint and green technologies has led to numerous energy related improvements, including more efficient refrigerants, variable speed compressors and fans, cycle modifications, and more efficient burners. As electrical energy usage and costs thereof increase in many markets, a need remains for making HVACR equipment more energy efficient in new as well as existing systems.

It would be desirable to provide original and/or retrofittable use/demand control and energy management technology for cooling/refrigeration compressors and/or heating/cooling blowers, including those used in HVACR systems, which can provide automatic control that is not reliant on remote sensors from the thermostat or other sensors and can improve energy efficiency over the OEM (Original Equipment Manufacturer) specifications, presettings, and/or installer judgment.

SUMMARY OF THE PRESENT INVENTION

A feature of the present invention is to provide an electronic controller which can be used as an add-on device in HVACR systems with thermostat control to automatically manage and reduce energy consumption and/or demand consumption in an improved manner as compared to operation with thermostat control itself.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to an electronic controller device for automatic control of a heating, ventilating, air conditioning or refrigeration (HVACR) system, which comprises a) at least one input connector for attaching at least one thermostat signal line and at least one output connector for attaching at least one signal line for outputting a control signal from the controller device to a load unit, wherein the controller device is capable of intercepting a thermostat command for a load unit of the HVACR system, b) a delayed start controller that is capable of delaying sending of a signal to power on a load unit and achieve a selected conditioned space temperature variation, and c) a demand regulator controller that is capable of calculating on times and off times to obtain a selected electrical demand. The electronic controller can further include at least one of an excess time controller and an excess cycle controller as options.

The present invention further relates to a heating, ventilating, air conditioning or refrigeration (HVACR) system comprising a heating, ventilating, air conditioning or refrigeration unit and the indicated electronic controller device that intercepts a thermostat control signal of the HVACR system and applies an algorithm thereto to generate an output control signal for a load unit of the HVACR system.

The present invention further relates to a system for automatic control of an HVACR system, comprising i) a thermostat, ii) the indicated electronic controller device, and iii) at least one of load unit operably connected to a power supply line.

The present invention further relates to a method for automatically controlling and managing energy usage and/or load demand usage and operation of at least one load unit powered by electricity in an HVACR system, comprising the steps of a) electrically connecting the indicated controller device in a control signal line between a thermostat for a load unit and an equipment load control switch for the load unit, b) intercepting at least one thermostat command from the thermostat for cooling, refrigeration, or heating at the controller device, c) applying an algorithm by the electronic controller to the intercepted thermostat command to generate an adjusted control signal or allow the OEM signal as an output signal, d) outputting the output signal generated by the controller device to a load unit switch to control operation of the load unit, and e) estimating the energy consumption and/or the demand consumption savings.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the features of the present invention and together with the description, serve to explain the principles of the present invention.

DETAILED DESCRIPTION OF THE PRESENT INVENTION

Figure 1:
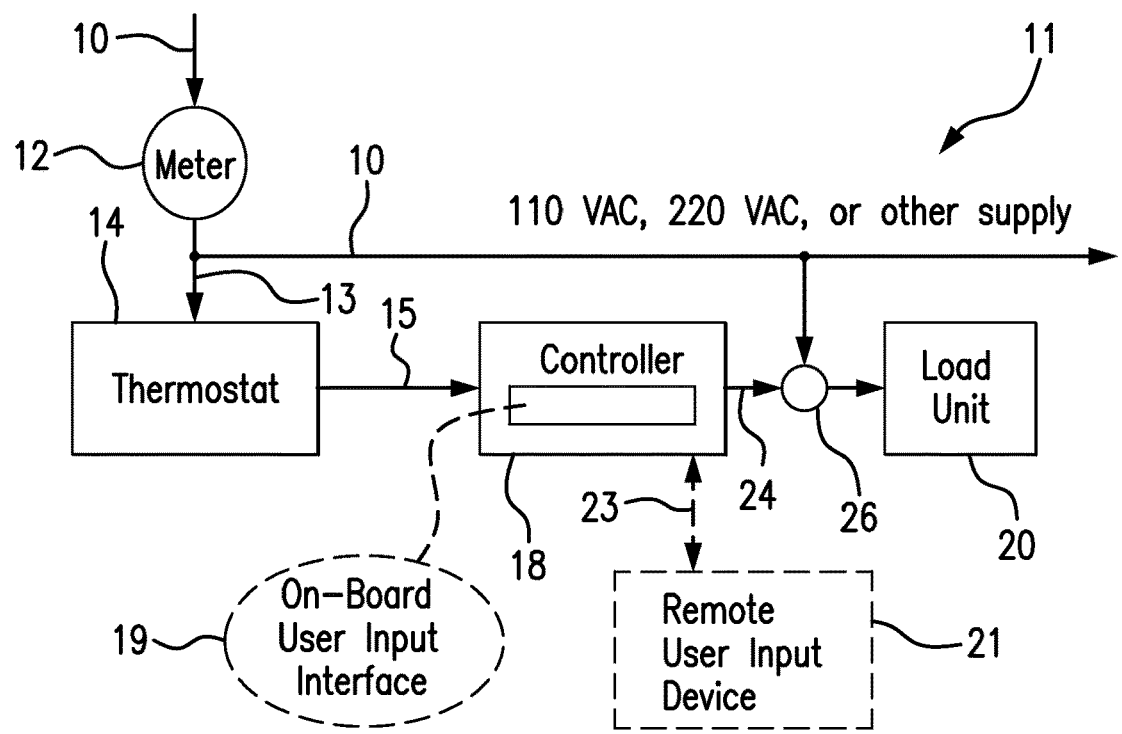
FIG. 1 is a block/schematic diagram of a HVACR system including an electronic controller according to an example of the present invention.

The present invention relates in part to a retrofittable controller add-on device including integrated programs that can automatically and optimally calculate and control execution of duty cycles and cycle time durations for heating equipment, cooling equipment, and/or refrigeration equipment that are controlled using duty cycling.

The add-on device comprises an electronic controller which can be installed in series in one or more thermostat control signal lines, which is capable of intercepting thermostat signals before they reach an intended load unit of an HVACR system. The electronic controller can apply an algorithm to OEM signals and behavior thereof to generate an output signal for the load unit that can replace (or allow)

the original control signal, to provide more energy efficient operation of the load unit in the system. In providing this improvement, the electronic controller can include at least a delayed start (DS) controller and a demand regulator (DR) controller, and optionally an excess time (ET) controller and/or an excess cycle (EC) controller. These controllers can be implemented as a suite of computer programs stored in memory and executable with a microprocessor embodied by the electronic controller. In combination, the programs can provide a signal processing algorithm. The electronic controller includes signal generation capability to output control signals from the controller device to the load unit. The electronic controller can be readily retrofitted into an existing HVACR system, or incorporated into a new HVACR system. The electronic controller does not need direct sensor support or line power to function as designed.

The delayed start controller included in the electronic controller can delay or postpone OEM ON signals from reaching the load unit. This can be done by applying a factor or multiplier to the OEM offtime. This results in a longer waiting period before the load unit is powered up. It has been found that this manipulation can provide energy savings without dramatically changing the temperature profile in the conditioned space. The electronic controller can improve demand management as well. The demand regulator controller included in the electronic controller can prevent the load unit from running continuously to meet demand. The demand regulator controller can periodically turn off the load unit, which may tend to increase the time period needed to provide a temperature adjustment back to the set point but providing a net reduction in the overall demand needed. This can be important because the cost of electricity, in commercial and industrial applications, is based on two items; (1) the total kW consumption and (2) the Peak kW demand. The total kW consumption is (ideally) proportional to the equipment runtime. The Peak kW demand is the largest average value of the kW consumption in a 15 or 30 minute interval or window. The Peak kW demand value is used to determine how electricity charges are established. Electricity is charged in different "declining block rates" of kWh, each of which has a kWh cost associated with it. The first block (the one filled first) is the most expensive; the second block (the one filled next) is less expensive, and so on. Given a constant total kW consumption, the total cost of electricity can be varied by the Peak kW demand value, the smaller the value of the Peak kW demand is made, the lower the cost. The indicated demand control regulator of the electronic controller of the present invention can be used to lower the value of Peak kW demand. The demand regulator controller can reduce the worst case demand while still providing adequate cooling or heating of conditioned space as applicable with the controlled load unit.

An excess time controller, which is optional, can be included in the electronic controller to alter the demand set point in situations where the electronic controller is in a continuous run state (i.e., in this state the OEM never turns off). When this occurs, the assumption is made that the temperature set point is not being met, so the demand set point is increased until the OEM control cycles. If the demand set point is increased to its maximum value and the OEM has still not cycled, the demand setpoint is set to 1.0 which effectively bypasses the controller and relinquishes control to the OEM. The excess cycle (EC) controller, which is optional, can be included in the electronic controller to control the number of equipment starts per hour so as not to exceed a maximum value by adjusting the controller output signal ON and OFF times.

FIG. 1 shows a HVACR system 11 including an electronic controller 18 on which the indicated delayed start controller, demand regulator controller, excess time controller, and excess cycle controller programs can reside and from which the programs can be executed for signal processing and generation. The electronic controller 18 can be retrofitted in the system 11 to provide control of at least one HVACR load unit 20 that provides condition control in a zone 2. Power line 10 passes through utility meter 12 at the structure where at least one load unit 20 to be controlled is located. Meter 12 measures usage and demand of electrical energy at that location. Load unit 20 can be, for example, an air conditioner, heat pump, furnace, refrigerator, boiler, or other load unit of a HVACR system. Operative main power line 10 generally is unconditioned, and supplies operative power to load unit 20 via load control switch 26, such as a relay, and typically other load units and appliances in the same structure (not shown). The power supply line 10 can be, for example, a 110 volts alternating current (VAC), or 220 VAC, or other mains power supply line powering the HVACR system 11 to be retrofit with the controller 18. The system 11 to be retrofit has at least one standard thermostat 14 connected to the HVACR load unit 20. Thermostat 14 can be connected via line 13 to power line 10. To simplify this illustration, a step-down transformer, such as 24 volt transformer, which may be used in powering the thermostat from power line 10, is not illustrated in this figure, but is illustrated in the wiring diagrams shown in FIGS. 9-18. Electronic controller 18 is not directly powered from power line 10, and it does not need to be. Electronic controller 18 is powered by the thermostat signaling intended for the load device(s). The electronic controller 18 typically is electrically dormant (or inactive) or sleeps with respect to its signal processing features until receiving/intercepting an ON signal from the thermostat, and then controller 18 becomes awakened (active) to apply a suite of programs as part of an algorithm such as shown herein for signal control processing and control signal generation to the intended load device(s).

In one typical situation, a control signal line 15 of thermostat 14 can transmit an AC voltage of 24 volts during the periods when a thermostatic control is, for example, calling for cooling from an air conditioning unit (load unit), or heating from an electric furnace, and so forth. The control signal would normally activate load control switch 26 in main power line 10 to power the load unit 20. That is, in the absence of electronic controller 18, control signal line 15 would be in control of opening or closing load unit control switch 26, and thereby opening or closing the circuit of operative power line 10 and controlling the flow of operative power to load unit 20. The electronic controller 18 is interposed and installed in the thermostat control signal line 15 in series at some point between thermostat 14 and the load unit control switch 26. As shown, thermostat line 15 can be cut and connected at one cut end to electronic controller 18. As also shown, the remaining portion of the cut signal control line, referenced as line 24, can be connected at one end to electronic controller 18 and at the other end to load control switch 26.

The electronic controller 18 can be physically mounted, for example, in sheet metal (not shown) near the load unit 20, such as a standard sheet metal construction enclosure used with the load unit. Preferably, this tapping of controller 18 into the control signal line 15 (24) is made as close as practically feasible to the load control switch 26. Usually it can be possible to make the connection within the physical confines of the load unit itself. The connection of electronic controller 18 in the control signal line could be made, for example, within the casing containing the compressor unit of a residential air conditioning unit. For example, the electronic controller 18 could be mounted in a sheet metal enclosure that houses the OEM controls for a compressor of an air conditioning unit as installed on a slab or platform near ground level immediately adjoining a home or building supported by the unit, or on a rooftop thereof. Electronic controller 18 can include on-board user interface controls 19 and/or can receive control inputs and/or parameter data 23 from a remote input device 21, which can be further understood by other descriptions herein that will follow. The input device 21 can be "remote" in the sense that it is a physically separate device from electronic controller 18, which can communicate with the controller, such as via an attachable/detachable communication wire or cable link or a wireless communication link.

In operation, electronic controller 18 receives electrical flow over control signal line 15 based on a thermostat control signal intended for powering up the load unit 20, and electronic controller 18 can immediately awaken to intercept the thermostat signal and initiate its suite of control programs before an output control signal is sent from the electronic controller 18 to the load unit switch 26. As indicated, the output control signal may be a replacement signal for the OEM signal or the OEM signal, depending on the outcome of the running of the controller's algorithm.

The thermostat 14 preferably is (pre)configured to generate only an ON/OFF signal, by which the air conditioner/heat pump compressor, furnace, or other load unit is turned on/off. Preferably, the thermostat 14 used in the system 11 is designed to provide ON/OFF control at a load unit to turn the load unit completely on or completely off. When the thermostat is an ON/OFF control device, the thermostat can decide if the output needs to be turned on, turned off, or left in its present state. ON/OFF control by an OEM thermostat typically comprises selecting a set point, and a native or default OEM deadband may apply or may be selected by a user, that straddles the set point. As described herein, one of the features of the controller of the present invention relates to a capability of adjusting and optimizing deadband type control to increase energy efficiency. A thermostat that provides variable speed control is less preferred for use in combination with the electronic controller.

The electronic controller 18 does not need direct inputs from a dedicated temperature sensor to operate and function as designed. The temperature sensing capability of the existing thermostat or thermostats in the system, or systems that include a remote sensor(s) that is capable of transmitting such information to the thermostat(s) for processing by that unit(s), can be relied on for the systems of the present invention. No temperature sensor needs be used at all in the HVACR systems using the controller, whether remote from the thermostat or as sensing component incorporated at the thermostat. A temperature signal can be estimated from OEM control signal timing and existing ASHRAE or similar data for setpoint and hysteresis temperature values.

Though FIG. 1 shows a single control line 15 cut and connected from a single thermostat 14 and connected to the electronic controller 18 for simplification, it will be appreciated that in single or dual thermostat configurations, such as shown in FIGS. 10, 12, and 14-17, multiple control lines from a single thermostat (e.g., FIGS. 10, 12, 14), or a single control line from each of multiple thermostats (e.g., FIGS. 15-17) each can be cut and separately connected to the electronic controller 18, such as different respective input pins of the electronic controller. Where the electronic controller 18 controls more than one load device, such as shown in FIGS. 10, 12, and 14-17, an output signal control line can be connected at one end to electronic controller 18 and at the other end to the load control switches of each load device. For example, although only one load unit 20 under the load control and management of electronic controller 18 in a single control signal line is shown in the HVACR system 11 of FIG. 1 for simplification, the HVACR system 11 can include multiple individual loads under thermostat control, such as, for example, multiple compressors, or a compressor unit and a blower, and other similar or diverse loads, depending on the configuration. As indicated, the electronic controller of this invention can be wholly connected in the control lines of individual subloads of the equipment. In other words, an air conditioner may have a separate control line for the subloads of the compressor unit and the blower unit. The electronic controller can be used to control either one or both of these subloads. The overall power line to all the subloads of the air conditioning unit is generally not in any way altered by the electronic controller of this invention. Further, the usual conventional electrical grounding means is not shown in the schematic diagram of FIG. 1 as it is not a matter of particular concern in this invention.

The electronic controller 18 of FIG. 1, for example, can be implemented in a stand-alone configuration or in networked configuration. A stand-alone configuration can be used, for example, in a single load unit residential application (e.g., <about 5 ton HVACR load unit). A networked configuration can be used, for example, as part of a building management system (BMS) for providing HVACR in a larger scale applications, such as higher energy use/demand residential, commercial or industrial buildings or equipment, and the like, or, as a network of electronic controllers, each attached to a dedicated load unit.

The electronic controller 18 in FIG. 1 includes at least one microprocessor operable to receive thermostat input signals, apply the indicated programs to thermostat signals received, and transmit an output signal under the command of the microcontroller to the HVACR load unit to be controlled.

Figure 2:
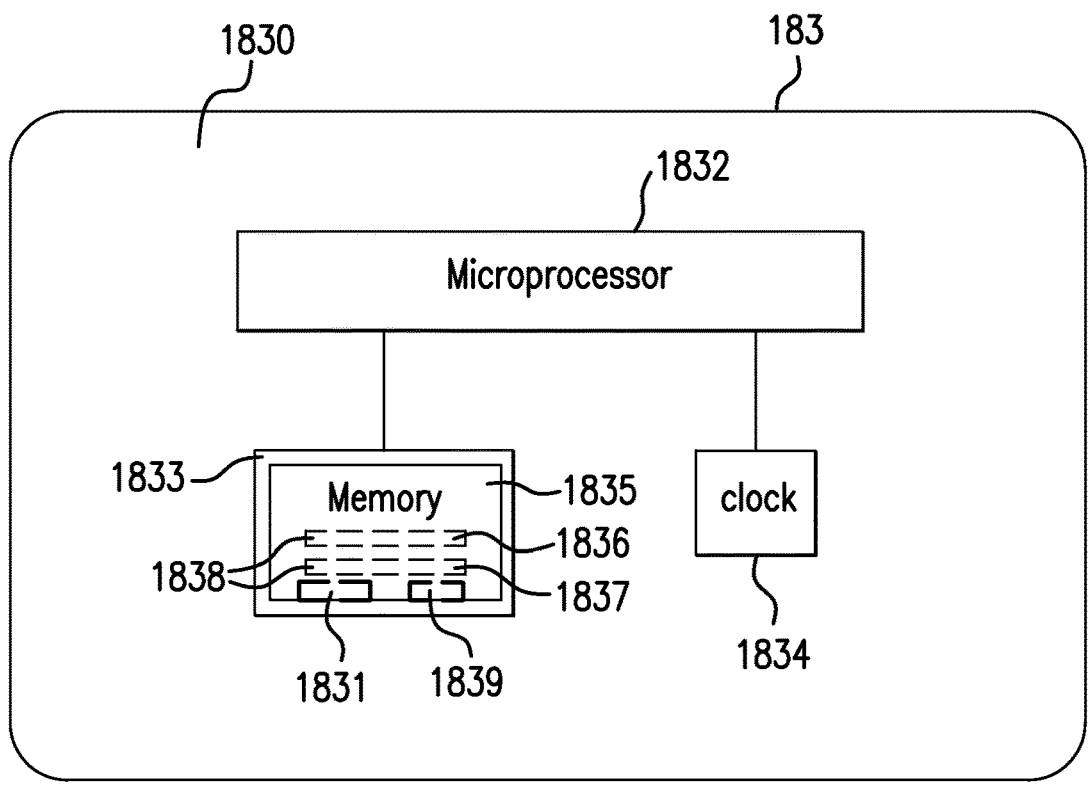
FIG. 2 is a block diagram of a microcontroller of the electronic controller of FIG. 1 according to an example of the present invention.

As shown in FIG. 2, the microcontroller 183 (18 in FIG. 1) can include, for example, a microprocessor for storing and executing the indicated the indicated delayed start controller, demand regulator controller, excess time controller, and excess cycle controller programs, as well as performing data collection function, controlling signal generation to the load device(s), and calculating the energy and/or demand savings. As shown in FIG. 2, microcontroller 183 can include a microprocessor 1832, a computer-readable storage medium 1833 shown as incorporating memory 1835, and clock 1834, which all have been integrated in the same chip. Microprocessor 1832, also known as a central processing unit (CPU), contains the arithmetic, logic, and control circuitry needed to provide the computing capability to support the controller functions indicated herein. The memory 1835 of the computer-readable storage medium 1833 can include non-volatile memory, volatile memory, or both. Computer-readable storage medium 1833 can comprise at least one non-transitory computer usable storage medium. The non-volatile memory can include, for example, read-only memory (ROM), or other permanent storage. The volatile memory can include, for example, random access memory (RAM), buffers, cache memory, network circuits, or combinations thereof. The computer-readable storage medium 1833 of the microcontroller 183 can comprise embedded ROM and RAM. As discussed in connection with FIG. 4 herein, read/write expansion (flash) memory for the microcontroller also can be provided. Programming and data can be stored in computer-readable storage medium 1833 including memory 1835. Program memory can be provided, for example, for the indicated delayed start controller program 1836, demand regulator controller program 1837, excess time controller program 1831, and excess cycle controller program 1839, as well as store menus, operating instructions and other programming such as indicated herein, parameter values and the like, for controlling the controller 18. These programs can be stored in ROM or other memory. In combination, the indicated delayed start controller program 1836, demand regulator controller program 1837, excess time controller program 1831, and excess cycle controller program 1839 provide an integrated control program 1838 residing on controller 18. Data memory, such as FLASH memory, can be configured with data parameters. Memory can be used to store data acquired that is related to the operation of a load device to be controlled, such as thermostat command on times and calculated off times. The clock 1834 can be a real time clock which does not power down with microprocessor features of the controller during OFF states. The clock 1834 provides a timing device that can be used for recording the onset or termination of the "ON" states. The electronic controller 18 can learn the thermostat OEM control behavior by recording "ON" states and their duration in time, and calculating "OFF" times. As the signal processing features of the controller are not typically operational during "OFF" states of the duty cycle based on the thermostat signals, the time duration of "OFF" states can be calculated by recording the time when the controller powers down as it will coincide with an OFF state of the duty cycle based on thermostat control, and recording the next time when OEM powers up again when intercepting the next successive power ON signal sent by the thermostat and intended for the load unit, and calculating the difference between these two recorded times as corresponding to the duration of that "OFF time." This data can be stored in non-volatile FLASH memory or other memory of the microprocessor. As indicated, the clock 1834 can be, for example, a real time digital clock. The clock 1834 can be battery powered (e.g., a lithium disc battery, and the like). The microprocessor 1832, memory 1833, and clock 1834, can all be integrated and supported on a common mother board 1830, or the like, which can be housed in an enclosure (not shown) having input and output connection terminal pins, a communication link/interface connector port(s) (e.g., a mini-, or micro- or standard-size USB port for receiving a corresponding sized USB plug), and the like, which are discussed further with respect to FIGS. 9-18.

Microcontroller 183 can be, for example, an 8 bit or 16 bit or larger microchip microprocessor including the indicated microprocessor, memory, and clock components, and is operable for input and execution of the indicated delayed start controller, demand regulator controller, excess time controller, and excess cycle controller programs. Programmable microcontrollers can be commercially obtained to which the control programs indicated herein can be inputted to provide the desired control. Suitable microcontrollers in this respect include those available from commercial vendors, such as Microchip Technology Inc., Chandler, Ariz. Examples of commercially available microcontrollers in this respect include, for example, the PIC16F87X, PIC16F877, PIC16F877A, PIC16F887, dsPIC30F4012, and PIC32MX795F512L-801/PT, by Microchip Technology, Inc.; Analog Devices ADSP series; Jennic JN family; National Semiconductor COP8 family; Freescale 68000 family; Maxim MAXQ series; Texas Instruments MSP 430 series; and the 8051 family manufactured by Intel and others. Additional possible devices include FPGA/ARM and ASIC's. The delayed start controller, demand regulator controller, excess time controller, and excess cycle controller programs indicated herein can be inputted to the respective microcontrollers using industry development tools, such as the MPLABX Integrated Development Environment from Microchip Technology Inc.

Though the controller 18 is illustrated in FIG. 1 as a stand-alone unit tapped into the thermostat signal line 15 (24) to the load unit to be controlled, the indicated microelectronics of the controller optionally may be incorporated and integrated into the thermostat unit or a Building Management System (BMS). An algorithm incorporating the delayed start controller, the demand regulator controller, the excess time controller, the excess cycle controller, and other indicated control programs and features of the electronic device can be added to native thermostat signal control software of the thermostat, or can be added to Building Management System (BMS) software where a BMS provides control to the load unit or units of the HVACR, eliminating a need for a physically separate electronic controller device. In the combined thermostat/electronic controller arrangement, the interception of the OEM thermostat signal and processing thereof by the controller microelectronics can occur at the modified thermostat unit without the need for a physically separate microelectronic controller being tapped into the thermostat signal line 15 (24) between the thermostat and the load unit to be controlled.

Figure 3A:
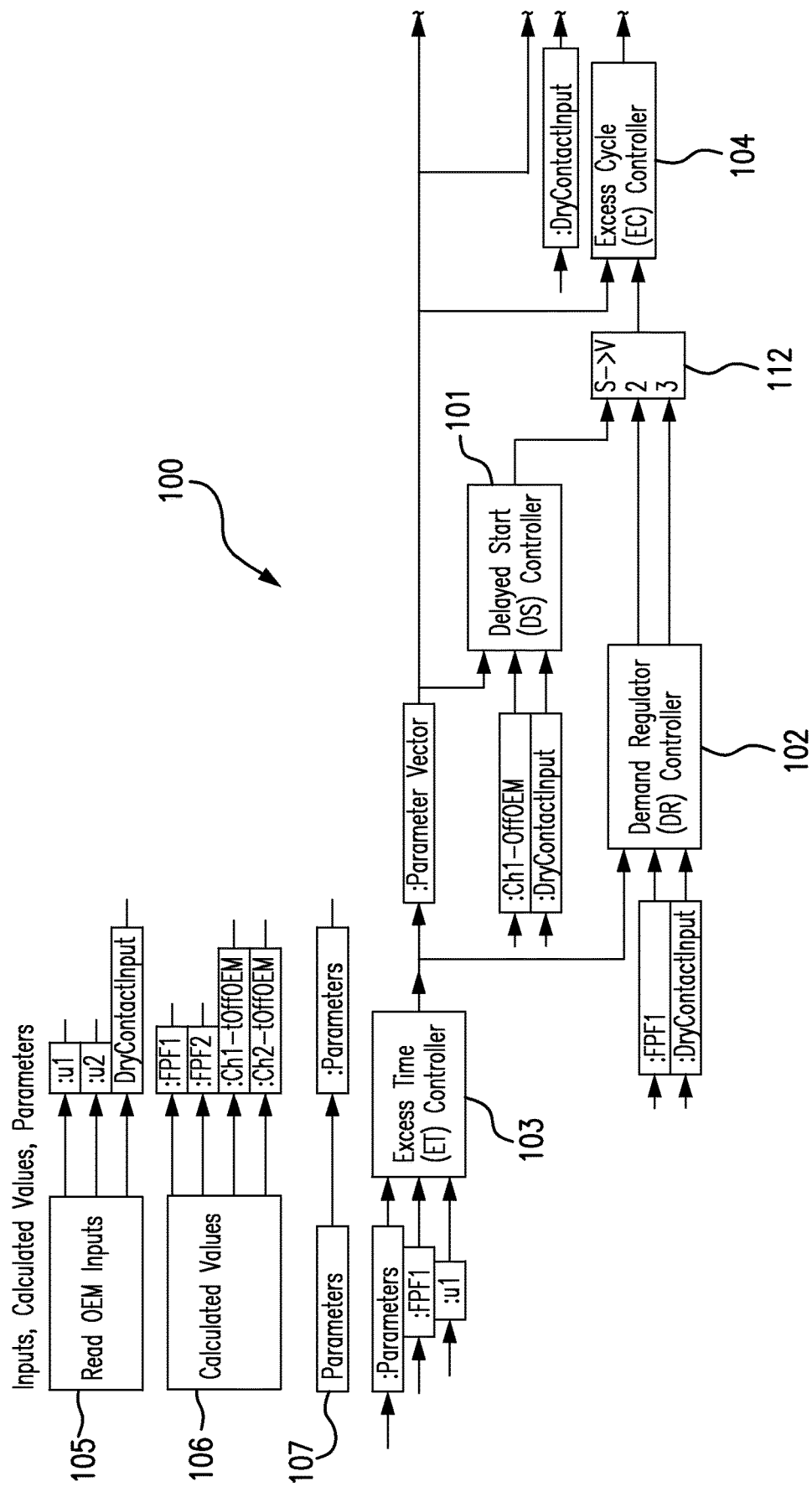
FIGS. 3A and 3B are a flow chart of process control logic of a process using the electronic controller for automatically controlling operation of a HVACR system according to an example of the present invention.
Figure 3B:
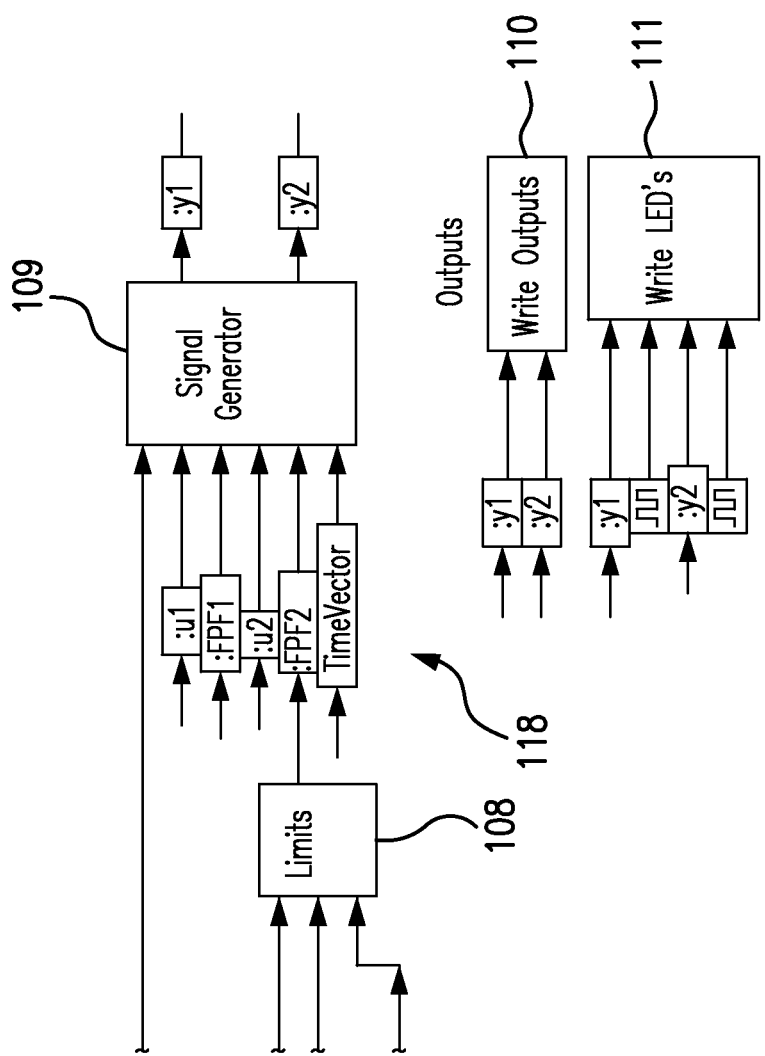

FIGS. 3A and 3B show process control logic 100 for the use of an electronic controller 100 of the present invention for automatically controlling operation of a HVACR system. Residing within the controller are (1) four controllers, (2) a limits module, and (3) a control signal generator, and other features indicated in FIGS. 3-8. As indicated, the controller prevents OEM thermostat signals from directly reaching the intended load unit(s) in the HVACR system, and intercepts those signals for learning and processing into optimized output signals for the intended load unit(s). Signal acquisition is time based. As indicated, OEM ON and OFF times can be determined by the electronic controller. The electronic controller embodies an algorithm that computes a triplet or triad of time outputs, which are delay time, on time, and off time with respect to control signals outputted to the load unit(s). These signals can be converted into a time-history signal in the "Signal Generator" block in FIG. 3B. The output signals can be stored and processed as binary output that has values of 0 or 1, such used for output y1 and y2 shown in FIG. 3B.

Readable inputs to the electronic controller include: 1) OEM inputs 105: OEM channel 1 (ch1)(u1: compressor or heater), OEM channel 2 (ch2)(u2; blower or compressor2 or heater2), and dry contacts for possible integration with a building management system (BMS) (all are 1/0=On/Off); 2) calculated values 106: FPF1 and FPF2 (first pass flags for OEM ch1 and OEM ch2, ch1-tOffOEM and ch2-tOffOEM (OEM ch1 and ch2 OFF times); and 3) parameters 107: configuration parameters inputted to the controller from a service tool or the like, and stored in memory (e.g., FLASH memory). The input channel 1 (u1) and channel 2 (u2) values can correspond to read OEM inputs for two different load units in the system. In systems with thermostat control provided for a single load unit, the OEM input for one of the channel 1 or channel 2 can be used. For calculated values 106, the OEM ch1 and ch2 OFF times can be initialized to zero for the first time the electronic controller is activated, and then calculated thereafter based on the OEM duty cycle history that is encountered. The electronic controller can configured through its parameter setting 107 to control a compressor, furnace, boiler, or other HVACR load units.

The electronic controller 100 can implement a delayed start controller 101, demand regulator controller 102, excess time controller 103, and excess cycle controller 104. These programs can be loaded into memory in the electronic controller, such as ROM, during assembly of the electronic controller or some other time before use. The demand regulator controller 102 and excess time controller are non-optional, and the delayed start controller 101 and excess cycle controller 104 can be optional. There is a sequence of implementation of these controllers. The delayed start controller 101, if used, is implemented first, and then the demand regulator controller 102 and excess time controller are implemented in parallel, but combine output for processing at the S→V box 112. This is followed by the excess cycle controller 104, if included, and the limits module 108, and ultimately the signal generator 109. The outputs of the controller are: 1) y1 and y2 (ch1 and ch2 outputs; 1/0=On/Off) to the compressor or heater, and blower, respectively, and 2) 4 LED signals. The output y1 corresponds with a channel 1 control signal for the compressor or heater and output y2 corresponds to channel 2 output for the blower. Write outputs and write LED's are indicated at 110 and 111. The algorithm can be executed at regular intervals of one times (x) a second, such as 2x/second, 3x/second, 4x/second, or 5x/second or other rates during time periods when the controller is awake.

Figure 4A:
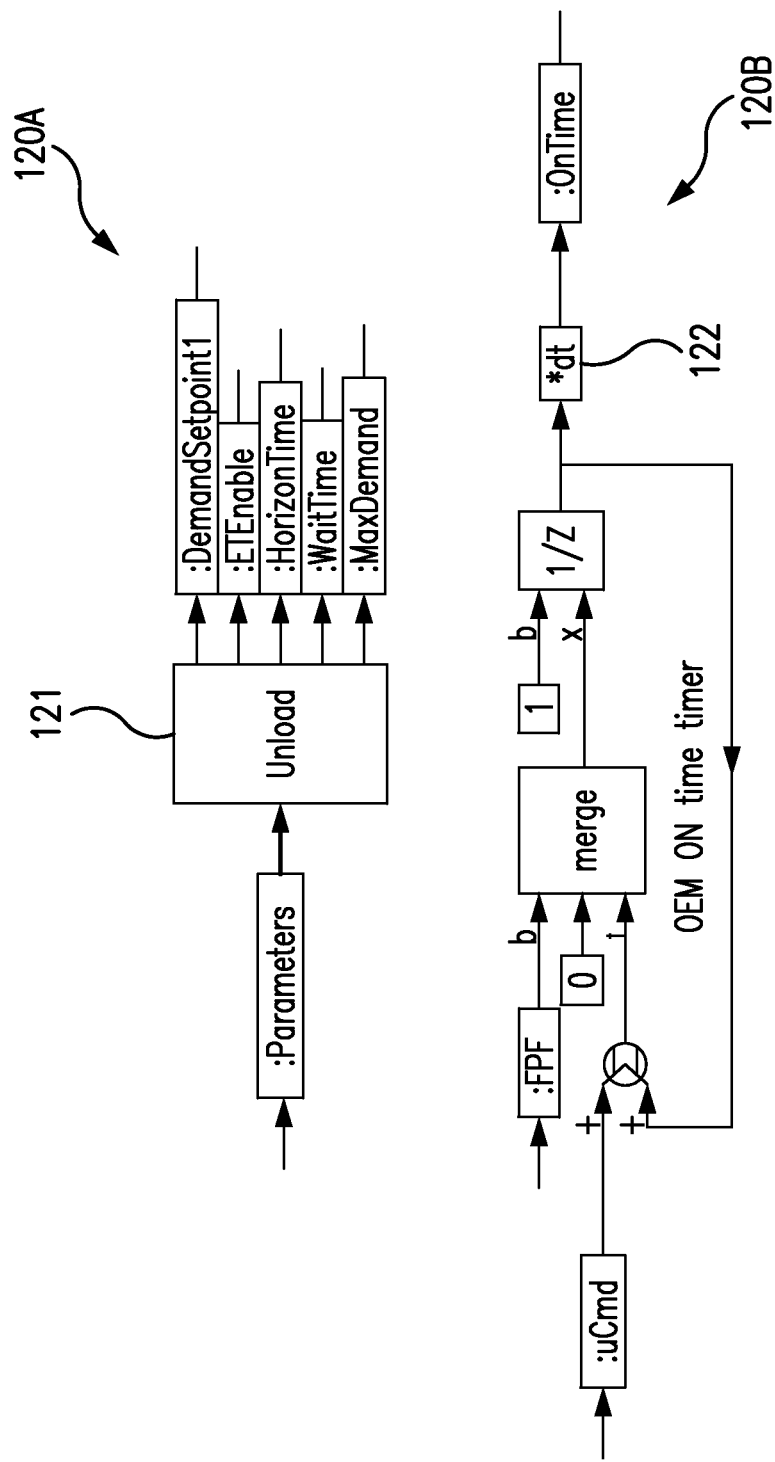
FIGS. 4A and 4B are flow charts of process control logic for the operation of an excess time controller of the electronic controller according to an example of the present invention.
Figure 4B:
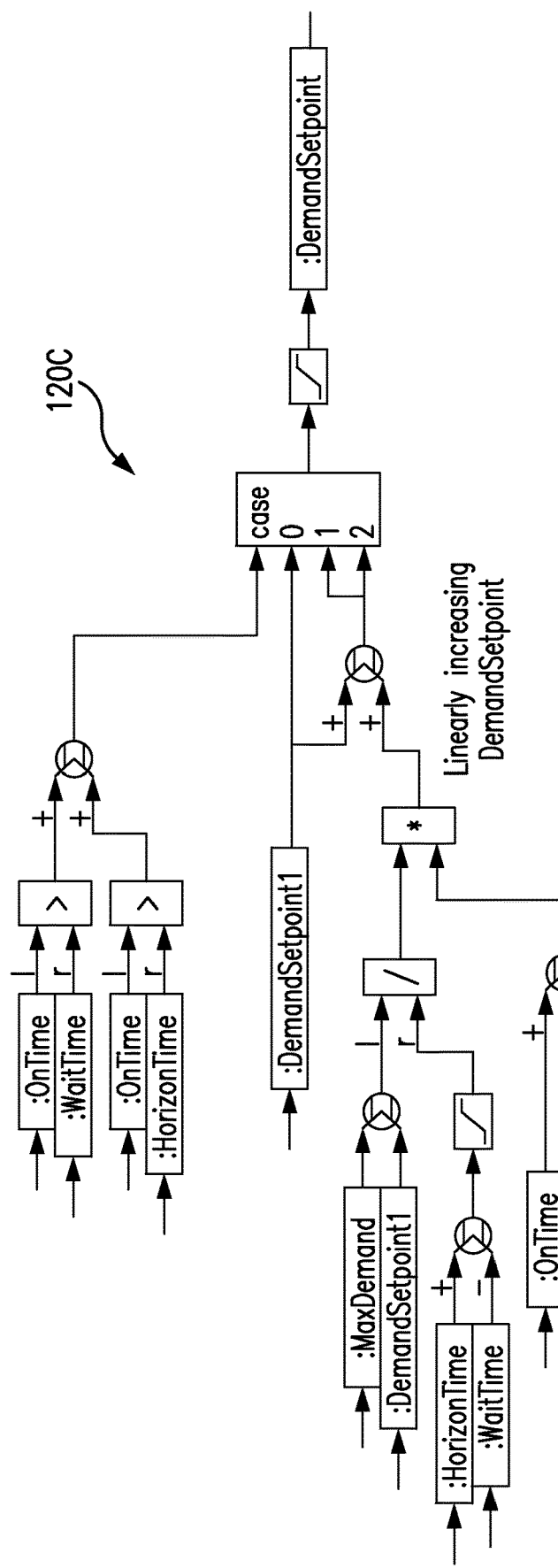

FIGS. 4A and 4B are flow charts of process control logic 120A, 120B, and 120C for the operation of the optionally-usable excess time controller of the electronic controller. Control logic 120A and 120B are shown in FIG. 4A, and control logic 120C is shown in FIG. 4C. As shown, the "Ontime" value generated by the process control logic 120B and unloaded parameters in control logic 120A as shown in FIG. 4A are used as input in the process flow logic 120C shown in FIG. 4B that continues from the control logic shown in FIG. 4A, in addition to other indicated calculated values and/or parameters. The excess Time (ET) Controller can alter the DemandSetpoint in situations where the controller is in a continuous run state (in this state the OEM never turns off). When this occurs, the assumption is made that the temperature setpoint is not being met, so the DemandSetpoint is increased until the OEM control cycles. If the DemandSetpoint is increased to its maximum value and the OEM has still not cycled, the DemandSetpoint remains at 1.0 which effectively bypasses the controller and allows the OEM to control. This function has 3 parameters: WaitTime=Initial run-on time, no action is taken during this time, and HorizonTime & MaxDemand: if after "WaitTime" seconds, the OEM has not cycled, the DemandSetpoint is increased linearly from its initial setpoint value, "DemandSetpoint1" by the value: (time after WaitTime)*(MaxDemand−DemandSetpoint1)/(HorizonTime−WaitTime). This controller can linearly increase DemandSetpoint to 1, if OEM does not cycle, and set DemandSetpoint=1 until next OEM cycle occurs.

Figure 5:
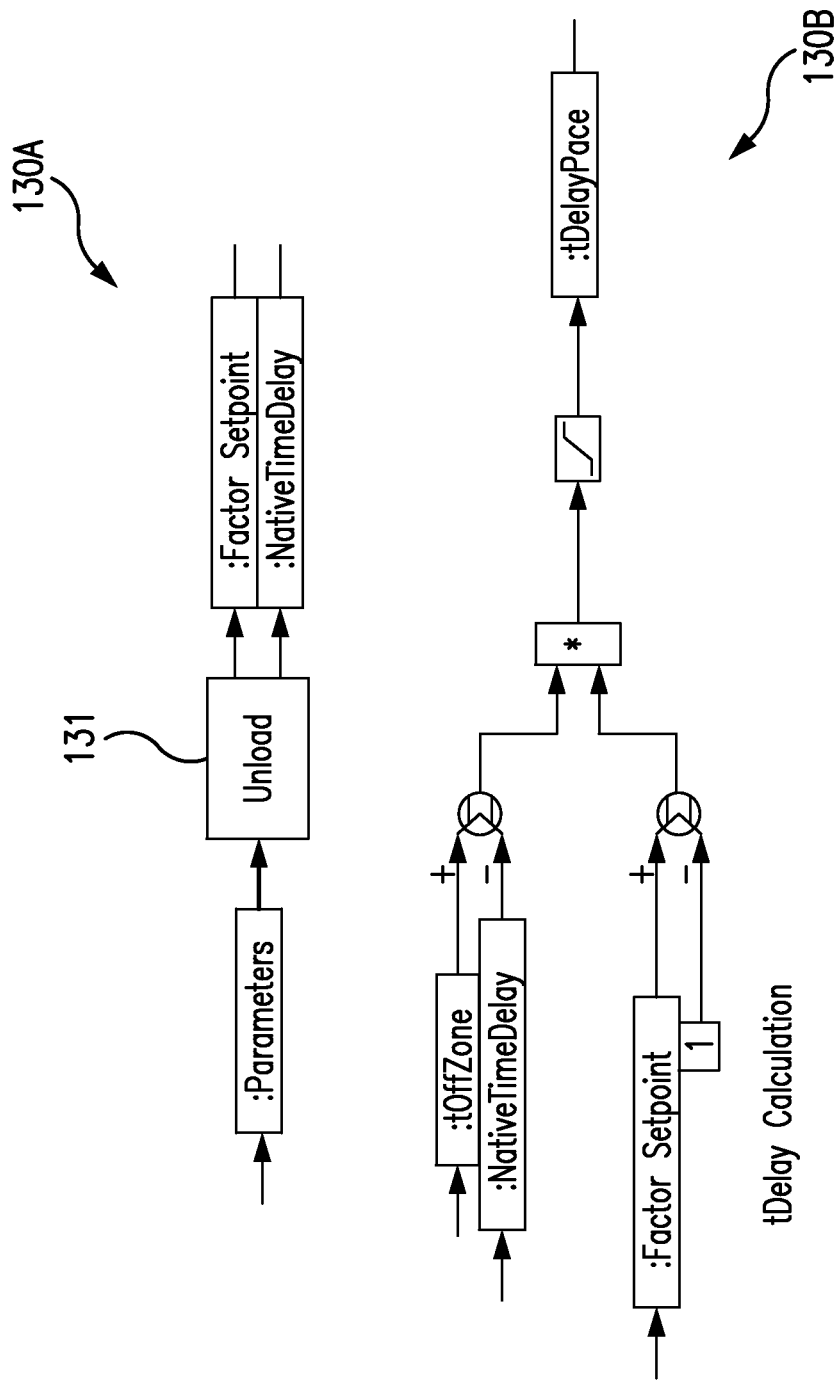
FIG. 5 is a flow chart of process control logic for the operation of a delayed start controller of the electronic controller according to an example of the present invention.

FIG. 5 is a flow chart of process control logic 130A and 130B for the operation of the delayed start controller of the electronic controller according to an example of the present invention. As shown, the "Factor Setpoint" and "NativeTimeDelay" values of the process control logic 130A are used as inputs in the process flow logic 130B as shown in FIG. 5, in addition to other indicated calculated values and/or parameters. The delayed Start (DS) Controller calculates a delay time (tDelayPace). For example, most OEM thermostats will control to within +/−1 degree Fahrenheit (° F.) of their setpoint, this means their deadband (Tdb) is 2 degrees Fahrenheit. If an OEM thermostat setpoint is set to 70° F., the zone temperature will range from 69 to 71° F. Tdb=2° F. (with the setpoint=70° F.), the OEM will control zone temperature from 69 to 71° F. If the Factor Setpoint is set to 1.75 the pace will control to a deadband=1.75*2=3.5° F. from 69° F. to 72.5° F. The time required for the 2° F. deadband to be traversed is measured as "tOffZone" (the OFF time of the zone). If the deadband is defined as dT1 and the Off time as t1, dT1/t1 can be written as equal (=) constant (approximately). If the off time value is doubled to t2=2*t1, the deadband will also be approximately doubled, dT2=2*dT1 for the ratio to remain constant=dT2/t2=dT1/t1. Factor is defined as dT2/dT1=Factor=t2/t1, which can be written as Factor*t1=t2 or, subtracting t1 from both sides Factor*t1−t1=t2−t1. The value t2−t1 is the additional time delay defined as "tDelayPace" and is solved as: tDelayPace=t1*(Factor−1). The Native Time Delay indicated in FIG. 5, is a time delay between the electronic call for heating or cooling and the time the equipment cycles on. It is sometimes present in OEM controls. If it is not known for the existing system, it can be determined by measuring the time from when a thermostat clicks on until the load unit turns on or by initializing using an estimate and adjusting the value as needed.

The tDelayPace value calculated by the Delayed Start controller can also be used to control the blower. The blower control can be turned on when the compressor is first turned on and remains on until the thermostat turns it off. This method prevents unwanted cycling of the blower during an OEM controller cycle but takes advantage of the initial delay as a savings mechanism.

Figure 6:
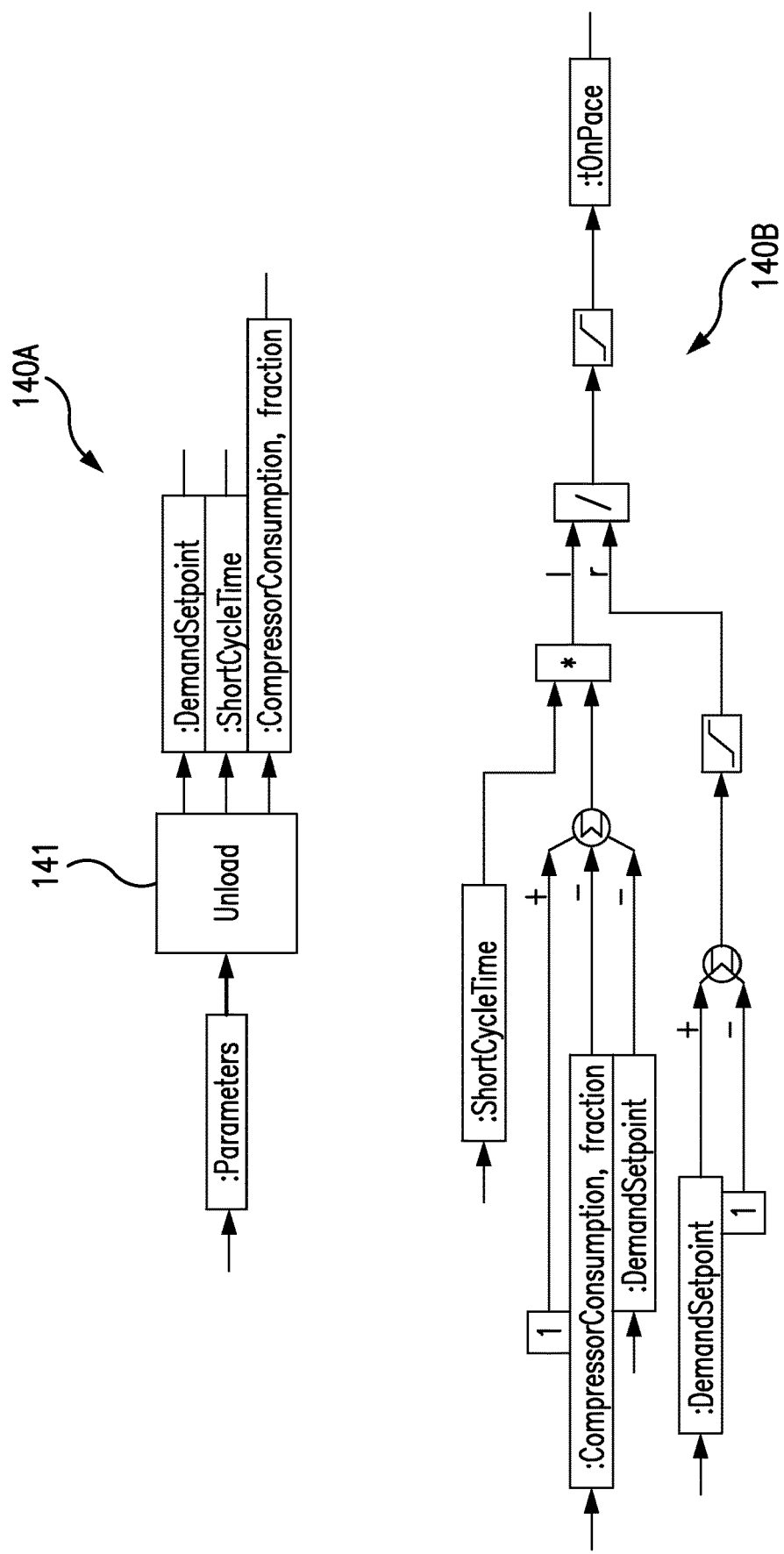
FIG. 6 is a flow chart of process control logic for the operation of a demand regulator controller of the electronic controller according to an example of the present invention.

FIG. 6 is a flow chart of process control logic 140A and 140B for the operation of the demand regulator controller of the electronic controller according to an example of the present invention. As shown, the "Demand Setpoint", "ShortCycleTime", and "CompressorConsumption fraction" values generated by the process control logic 140A are used as inputs in the process flow logic 140B as shown in FIG. 6, in addition to other indicated calculated values and/or parameters. The demand regulator controller can calculate a controller-output "on" time value, a "tOnPace value," to achieve a Demand Setpoint. The Demand Regulator (DR) Controller calculates the controller-output ON time given the Duty Cycle (Demand Setpoint) and the controller OFF time (tOffPace=ShortCycleTime) by solving the following equation for tOnPace:

> Demand Setpoint=(tonPace/(tOnPace+tOffPace))
> \*CompressorConsumption, fraction+1−CompressorConsumption, fraction). The blower consumption is defined as (1−CompressorConsumption, fraction). The rightmost term assumes the blower is ON full time for this calculation (hence the presence of the (1−CompressorConsumption, fraction). This function also will not allow tOnPace to drop below a value that would cause the Demand Setpoint to be less than the blower consumption fraction (1−CompressorConsumption, fraction). If this occurs, tOnPace is set to 0 which effectively turns off the compressor.

As indicated, the Demand Regulator (DR) Controller can adjust the controller-output "on" (tOnPace) and "off" (tOffPace) times sent to the load unit such that a desired electrical demand can be achieved. Theoretically, electrical demand typically is calculated as the total "on" time during a 15 minute interval. The DR controller can estimate the "worst case" demand which is the condition where the Pace controller is continuously cycling during the entire 15 minute interval. The worst case demand becomes more accurate as the load increases and less accurate at lower loads, however, it always estimates the worst case demand which is greater than the actual demand. The DR controller fixes the tOffPace value to the short cycle time (e.g., typically 3-4 minutes) and can adjust the tOnPace to meet the desired demand.

Figure 7A:
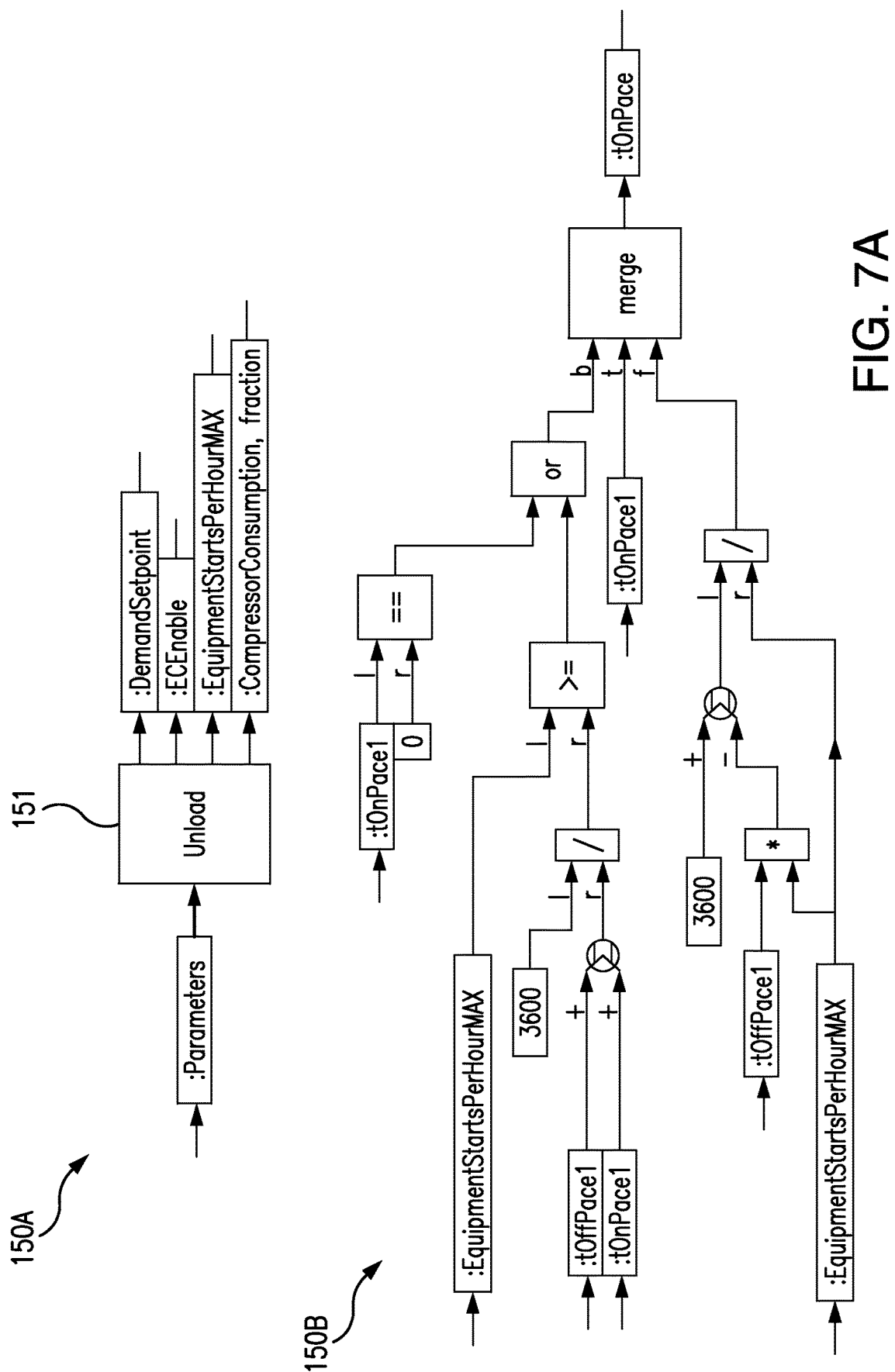
FIGS. 7A and 7B are flow charts of process control logic for the operation of an excess cycle controller of the electronic controller according to an example of the present invention.
Figure 7B:
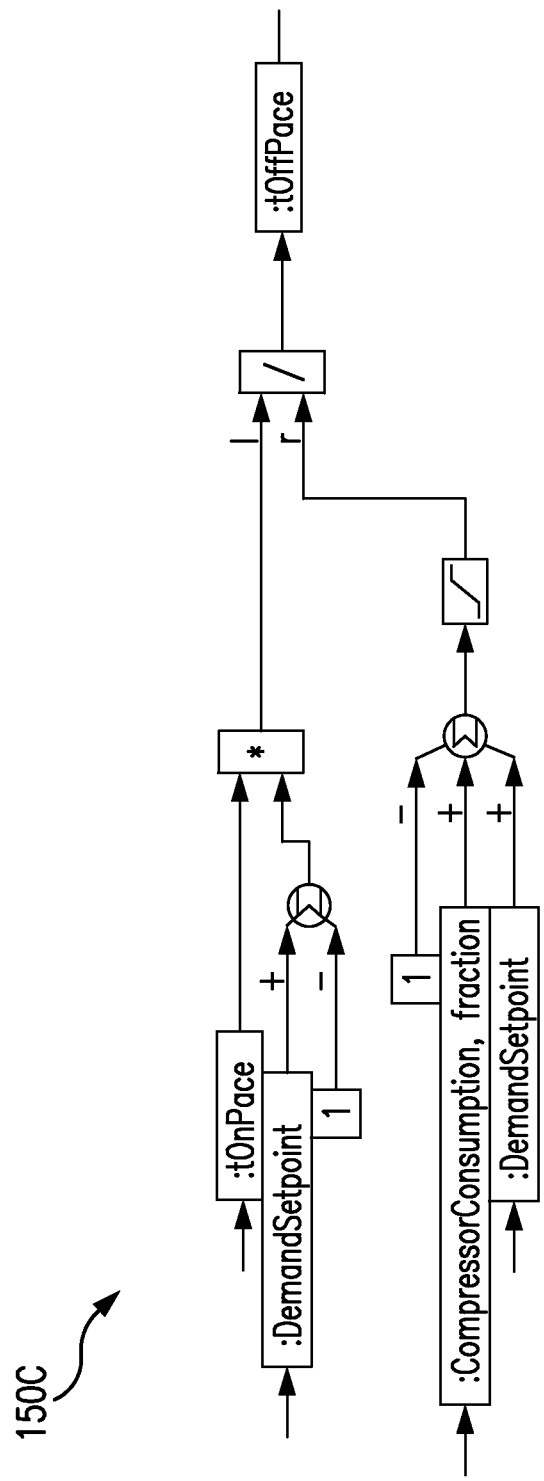

FIGS. 7A and 7B are flow charts of process control logic 150A, 150B, and 150C for the operation of an optionally-usable excess cycle controller of the electronic controller according to an example of the present invention. Control logic 150A and 150B are shown in FIG. 7A, and control logic 150C is shown in FIG. 7B. As shown, the "EquipmentStartsPerHourMAX" value of the process control logic 150A is used in the process control logic 150B, and the "tOnpace" value generated by the process control logic 150B and the "DemandSetpoint" and "CompressorConsumption Factor" values generated by the process control logic 150A are used as an input in the process flow logic 150C shown in FIG. 7B that continues from the control logic shown in FIG. 7A, in addition to other indicated calculated values and/or parameters. The excess cycle controller can increase tOnPace to meet equipment starts per hour maximum (MAX). The excess cycle (EC) controller controls the number of equipment starts per hour so as not to exceed a maximum (MAX) value by adjusting tOnPace and tOffPace. First, the excess cycle controller determines if the number of equipment starts per hour exceeds MAX. If it does, then tOnPace is increased until the Actual Equipment Starts per Hour<MAX value. If, after increase of tOnPace, the Demand Setpoint is still not being achieved, tOffPace is then increased until DemandActual (equal to tOnPace/(tOnPace+tOffPace))≤DemandSetpoint. Thus, if tOnPace has been modified and the Demand is not being met, tOffPace is then further adjusted to meet the Demand setpoint.

Figure 8A:
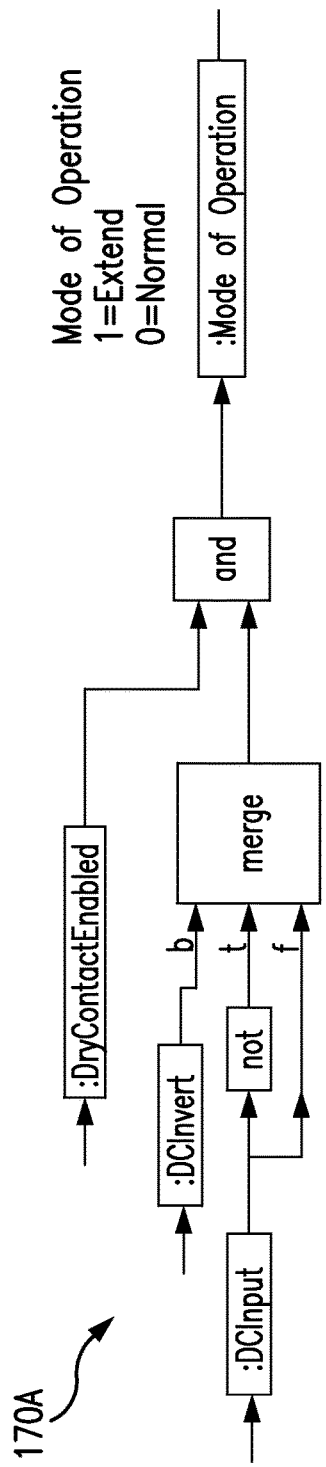
FIGS. 8A and 8B are flow charts of process control logic for the limiting of equipment "delay time, on time, and off time" using the electronic controller according to an example of the present invention.
Figure 8B:
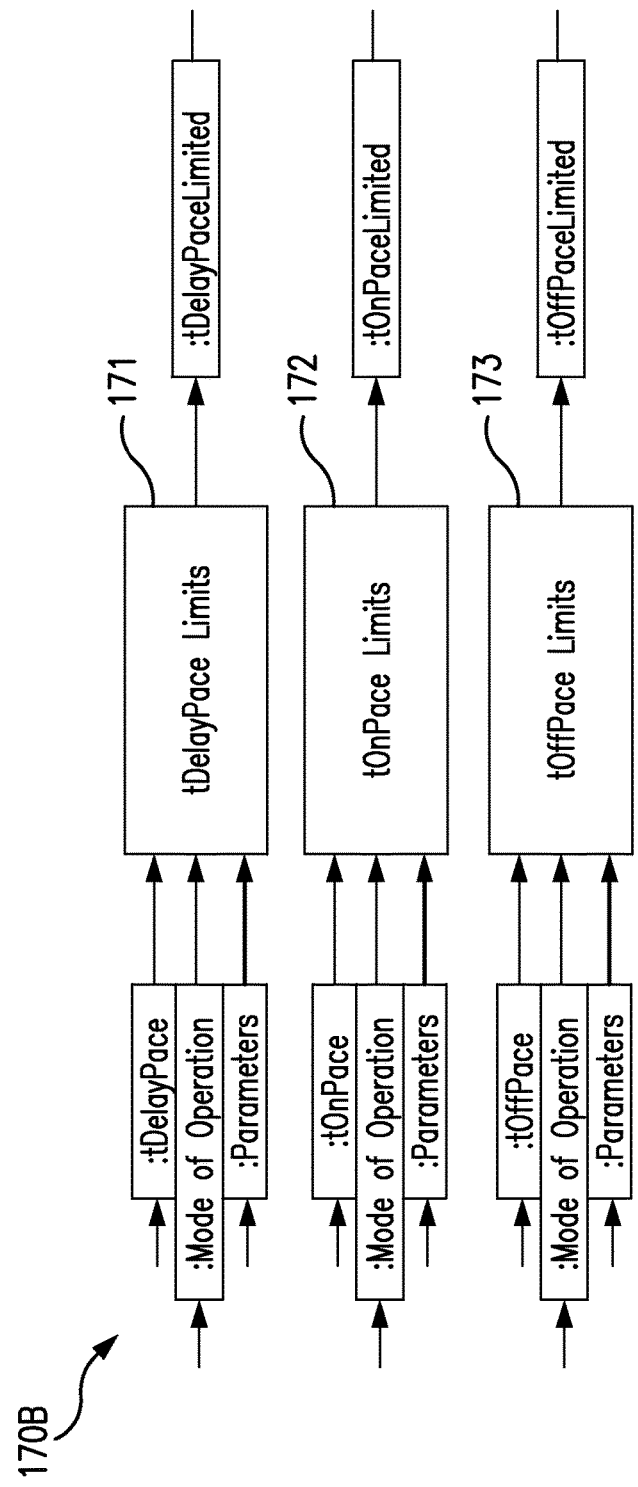

FIGS. 8A and 8B are flow charts of process control logic 170A and 170B, respectively, for the limiting of equipment starts using the electronic controller according to an example of the present invention. As shown, the "Mode of Operation" generated by the process control logic 170A in FIG. 8A is used as an input in the process flow logic 170B shown in FIG. 8B, in addition to other indicated calculated values and/or parameters. This function applies minimum (MIN) and maximum (MAX) limits to tOnPace, tOffPace, and tDelayPace. The DryContactInput may be used to select the Mode of Operation defined as follows: 1=Extend (excessive heating or cooling required); 0=Normal. The DryContactInput may be used to select whether Normal or Extend settings are used for limiting the tDelay, tOn, and tOff ("Pace") values controlled by the electronic controller. DryContactEnabled: 1/0=Enable/Disable the dry contact input. DryContactInput=1/0=Open circuit/Closed circuit. DCInvert allows reversing of the polarity of the DryContactInput signal. When DCInvert="OFF"=0, the mode of operation is set to the DryContactInput value. When DryContactInput=1, extend Settings are used. When DryContactInput=0, normal settings are used. When DCInvert="ON"=1, the mode of operation is set to the not (DryContactInput) value. When DryContactInput=1, normal settings are used. When DryContactInput=0, extend settings are used.

As examples, in a heating application:

In a heating application, a 55° F. snap sensor on OAT can be used to detect excessive heating requirements, wherein the sensor closes at temperatures<55° F. and opens at temperatures>55° F.; and DryContactInput=0/1 (closed/open=extend/normal)=<55° F./>55° F.=Extend values/Normal values; and set DCInvert=OFF.

In a cooling Application: an 85° F. snap sensor on OAT can be used to detect excessive cooling requirements; the sensor closes at temperatures>85° F. and opens at temperatures<85° F.; DryContactInput=1/0 (open/closed=normal/extend)=<85° F./>85° F.=Normal values/Extend values; and set DCInvert=ON.

In a heat pump application: a 55° F. snap sensor on the evaporator line can be used to detect if the heat pump is in cooling or heating operation; the sensor closes at temperatures<55° F. (for cooling) and opens at temperatures>55° F. (for heating); DryContactInput=0/1 (closed/open=normal/extend)=<55° F./>55° F.; and extend values are used for heating and normal values are used for cooling; and set DCInvert=OFF.

Figure 8C:
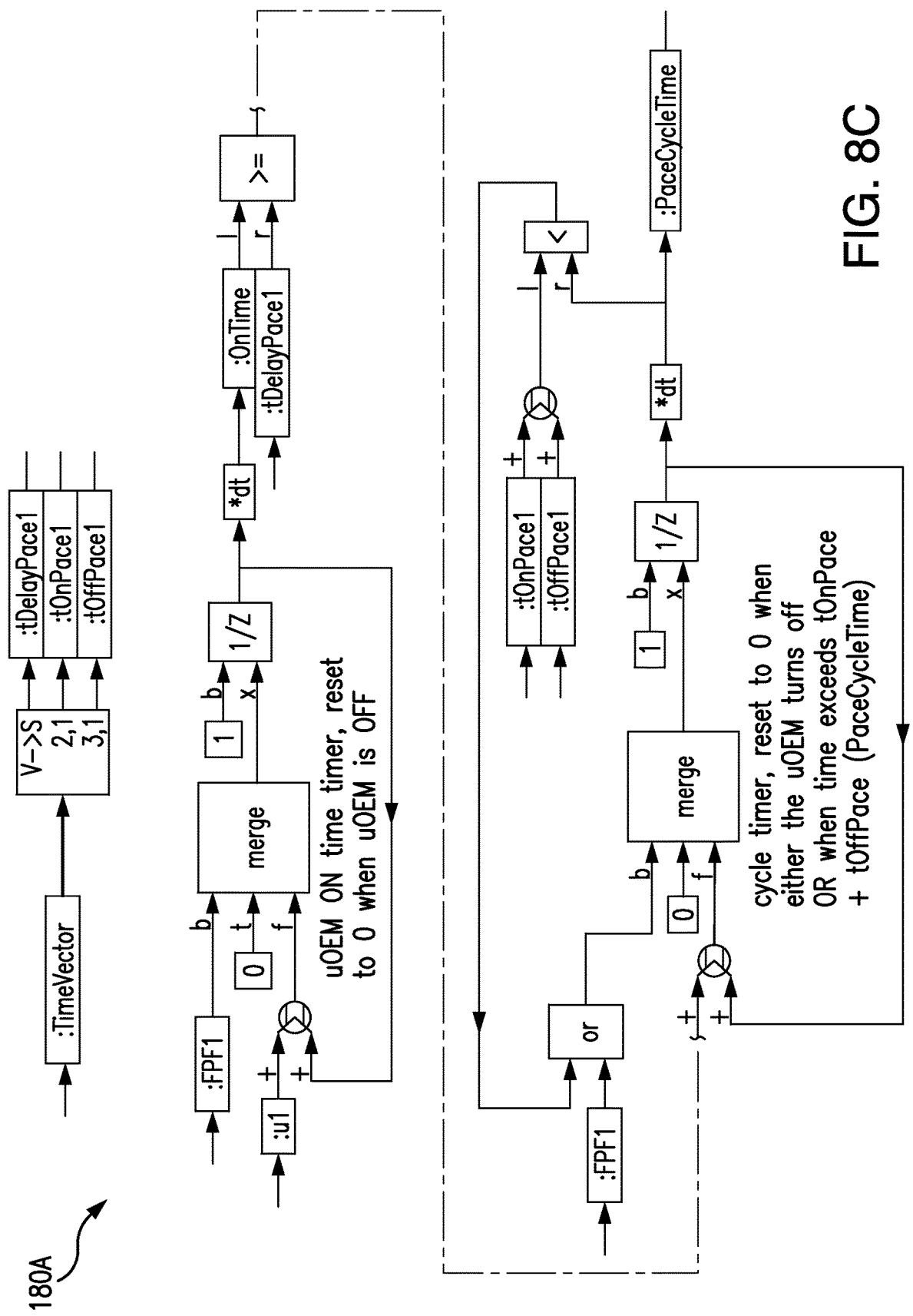
FIGS. 8C and 8D are flow charts of process control logic for the operation of a signal generator of the electronic controller shown in FIGS. 3A and 3B according to an example of the present invention.
Figure 8D:
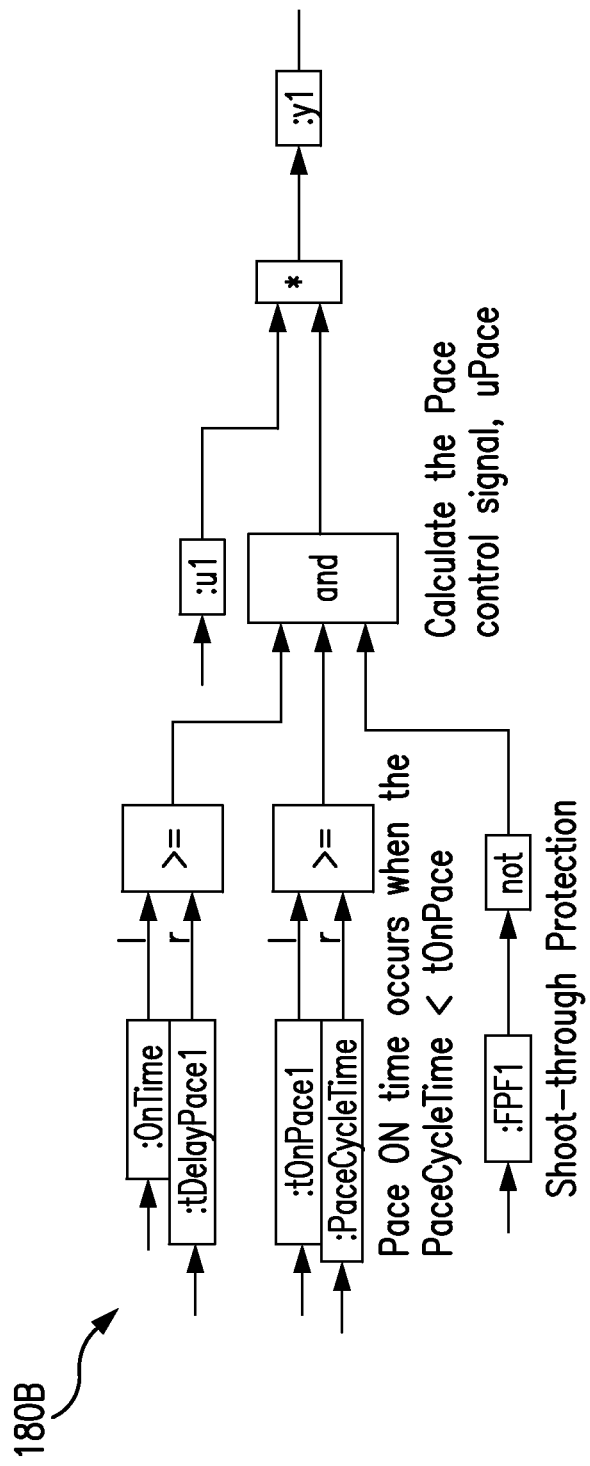

FIGS. 8C and 8D are flow charts of process control logic 180A and 180B, respectively, for the operation of the Signal Generator 109 of the electronic controller shown in FIG. 3B. As shown, the "PaceCycleTime" value generated by the process control logic 180A in FIG. 8C is used as an input in the process flow logic 180B shown in FIG. 8D that continues from the control logic shown in FIG. 8C, in addition to other indicated calculated values and/or parameters. For simplicity, in FIGS. 8C-8D, only one of the two channels is shown (channel 1 with input u1 and output y1). The second channel 2 (channel 2 with input u2 and output y2) can be processed similarly as shown for channel 1. The Signal Generator 109 can function to create a binary modulated control signal as a function of the time triplet, (tDelayPace1, tOnPace1, and tOffPace1), calculated by the indicated DS and DR controllers. The Signal. Generator can operate as follows: when the OEM control signals transitions from OFF to ON, the First Pass Flag (FPF1) is pulsed which begins running the timer function "uOEM ON time timer" in FIG. 8C to measure the "OnTime" of the OEM control signal. As soon as the "OnTime" exceeds the "tDelayPace1" value, the "cycle timer" function begins calculating the "PaceCycleTime". The "PaceCycleTime" is reset to 0 each time it exceeds the desired cycle period "tOnPace1+tOffPace1". The "y1" control signal is ON when the "OnTime">"tDelayPace1" AND "PaceCycleTime"<"tOnPace1", otherwise it is OFF.

The functions of the various controllers and modules and other features of the process control logic shown in any of FIGS. 3, 4A-B, 5, 6, 7A-B, and 8A-D can be implemented using software that is executable with the indicated microprocessor of the electronic controller.

Figure 8E:
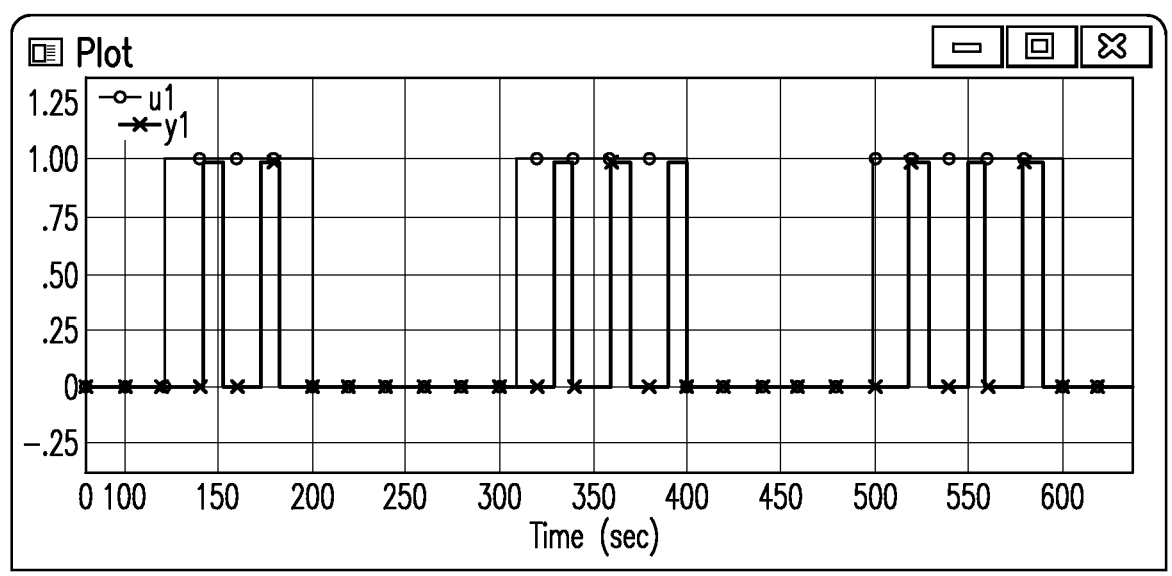
FIG. 8E is a plot which illustrates channel 1 input (u1) and channel 1 output (y1) time histories for the operation of the signal generator of FIGS. 3B, 8C, and 8D according to an example of the present invention.

Referring to FIG. 8E, to illustrate the operation of the Signal Generator 109 shown in FIGS. 3, 8C, and 8D, an OEM signal, u1, is applied to the Signal Generator in an example using the following settings: tDelayPace1=20 seconds, tOnPace1=10 seconds, and tOffPace1=20 seconds. The u1 and y1 time histories are presented in FIG. 8E. For a given cycle of the u1 signal, the y1 signal evolves initially with a tDelayPace1=20 seconds followed by a repeating sequence of 10 seconds ON (tOnPace1) followed by 20 seconds OFF (tOffPace1). The y1 signal turns off when the u1 signal turns off. The u1 signal in the above diagram evolves with an ON time that increases between cycles, that is the reason that there are only 2 y1 cycles in the first u1 cycle and 3 y1 cycles thereafter.

The wiring terminations for each of ten examples of installation configurations are presented below with reference made to FIGS. 9-18. For all of these illustrations in FIGS. 9-18, the electronic controller 1018 provides two independent control channels that may be wired to support different equipment configurations. Referring to the first pin module 1001, the first channel 1001A comprises one of pins 1-3, and the second channel 1001B comprises one of pins 4-6 thereof. Output lines to the load unit(s) are shown as extending from one of pins 4-6. The first channel 1001A and second channel 1001B are only specifically identified in FIG. 9, and it will be understood that the same indicated pin assignments for these channels can apply in similar pin module 1001 as shown in the electronic controller 1018 in each of FIGS. 10-18. In addition, the controller provides a separate "dry contact" input channel that may be used for remote control of the controller, such as by an existing BMS system. Referring to the second pin module 1010, pins 1-2 thereof can be used for this dry contact input module. A communication port 1020 is shown in these figures as a mini-USB port (e.g., a camera size USB port) but is not limited thereto. A service tool (not shown) can be used to import/input parameters, and the like into the electronic controller 1018 by making a communication link with the controller via port 1020. The electronic controller 1018 can have the indicated delayed start controller, demand regulator controller, excess time controller, and excess cycle controller programs preloaded into the controller on-board memory during its assembly and before installation in the field.

Figure 9:
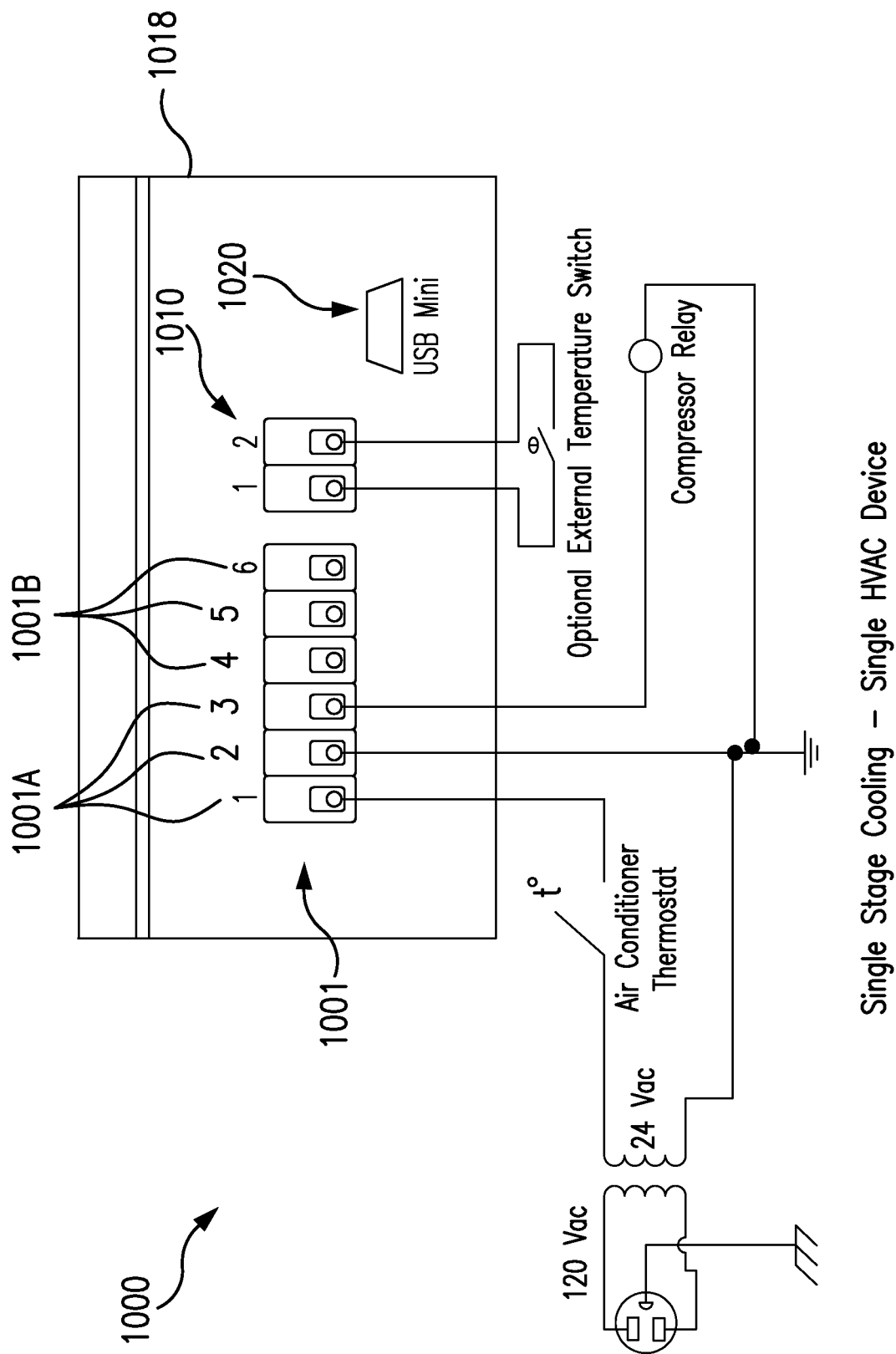
FIG. 9 is an electrical connection diagram for a single stage cooling application using the electronic controller according to an example of the present invention, wherein this configuration is shown as used when a single thermostat is used to control one HVAC cooling device (e.g., a compressor).

FIG. 9 shows an electrical connection diagram 1000 for a single stage cooling application using an electronic controller according to an example of the present invention. The wiring termination for this configuration is presented in the figure. This configuration can be used when a single air conditioner thermostat is used to control one HVAC cooling device (a compressor). This configuration also supports thermostats that provide a manual switch to select either heating or cooling operation. The compressor can be a compressor suitable for use in vapor-compression cooling/refrigeration systems. The compressor can include an electric motor (not shown), used to drive the compressor. The electric motor itself can be a conventional electric motor or other suitable electric motor used or useful for driving such load units.

The thermostat can deployed at some point in a building and senses the temperature of the ambient air and if it is higher than the comfort setting which has been selected, sends a signal to activate the air conditioning unit. As indicated, in the present invention, the controller intercepts the thermostat signal, which powers up the electronic controller to process the signal according to its programmed algorithm before sending a controller-processed output signal to the load unit. The air conditioning unit typically comprises the compressor, and a condenser and evaporator connecting with each other in a closed refrigerant system (not shown). The refrigeration cycle itself is well known (e.g., see, U.S. Pat. No. 4,094,166, which is incorporated herein by reference in its entirety). Basically, gaseous refrigerant is delivered from the compressor to the condenser coil where it gives up heat and then is passed through an expansion valve to the evaporator coil where it absorbs heat from the circulating air which is passed thereover by the evaporator fan. When the thermostat senses that the ambient air has been cooled to the selected level, the thermostat goes to an off state to turn off the compressor, evaporator fan and condenser fan until the ambient temperature has again reached the level where further cooling is necessary. As indicated, the electronic controller of the present invention goes to sleep when the thermostat stops signaling the load unit, until the next power on signal is sent by the thermostat to the same load unit which, as indicated, will be intercepted by the electronic controller which powers up the electronic controller to process the signal according to its programmed algorithm before sending a controller-processed output signal to the load unit. As indicated, a deadband typically is applied to the control temperature setting at the thermostat, which deadband effectively can be modified by the electronic controller to increase energy savings in a controlled manner.

Figure 10:
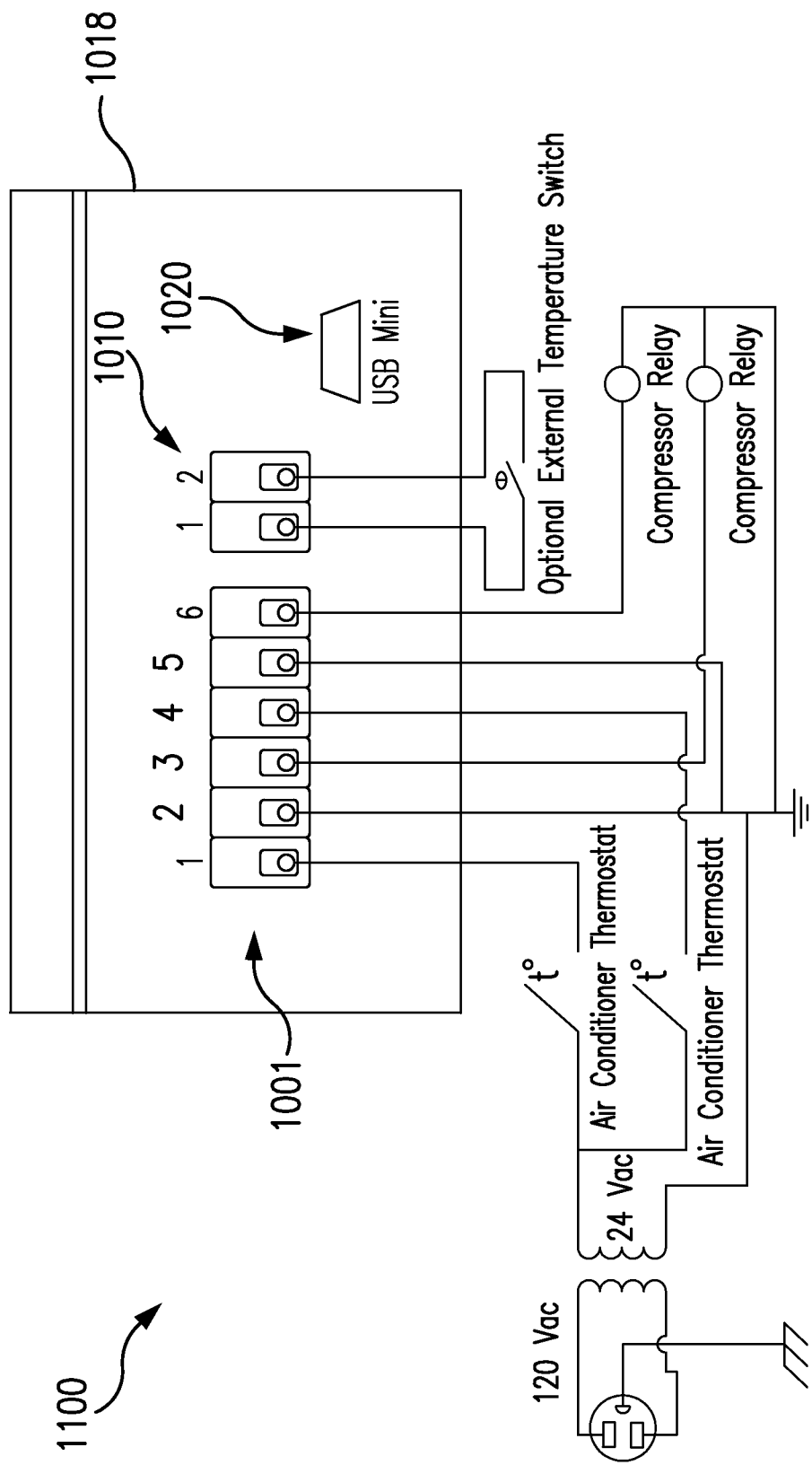
FIG. 10 is an electrical connection diagram for a dual stage cooling application using the electronic controller according to an example of the present invention, wherein this configuration is shown as used when dual thermostats are used to control two HVAC cooling devices (e.g., two compressors).

FIG. 10 shows an electrical connection diagram 1100 for a dual stage cooling application using an electronic controller according to an example of the present invention. The wiring termination for this configuration is presented in the figure. This configuration can be used when a single thermostat is used to control two HVAC cooling devices, which are two compressors in this example. This configuration also supports thermostats that provide a manual switch to select either heating or cooling operation.

Figure 11:
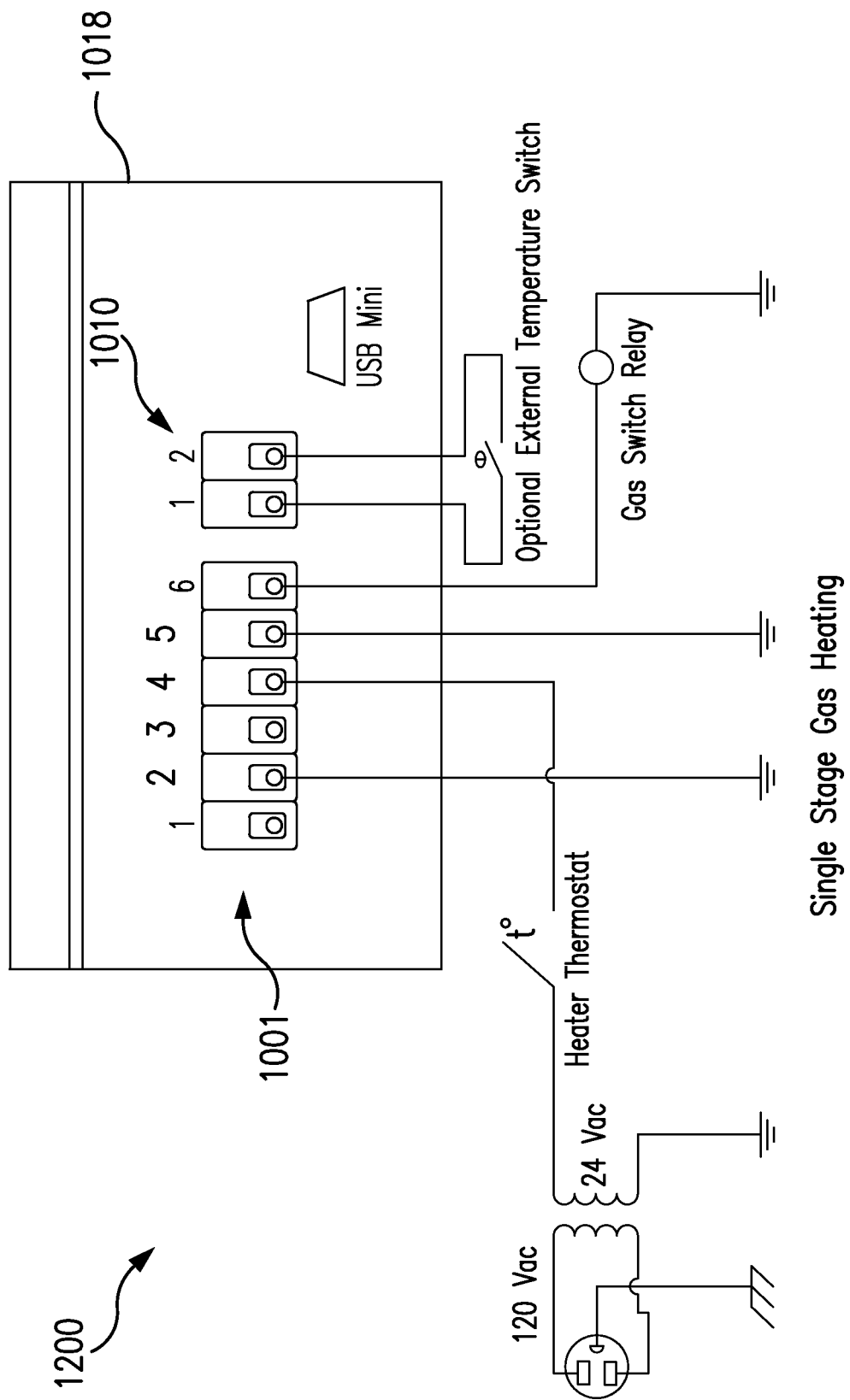
FIG. 11 is an electrical connection diagram for a single stage gas heating application using the electronic controller according to an example of the present invention, wherein this configuration is shown as used when a single thermostat is used to control one single stage gas heating device.

FIG. 11 shows an electrical connection diagram 1200 for a single stage gas heating application using an electronic controller according to an example of the present invention. The wiring termination for this configuration is presented in the figure. This configuration can be used when a single thermostat is used to control one single stage gas heating device. This configuration also supports thermostats that provide a manual switch to select either heating or cooling operation.

Figure 12:
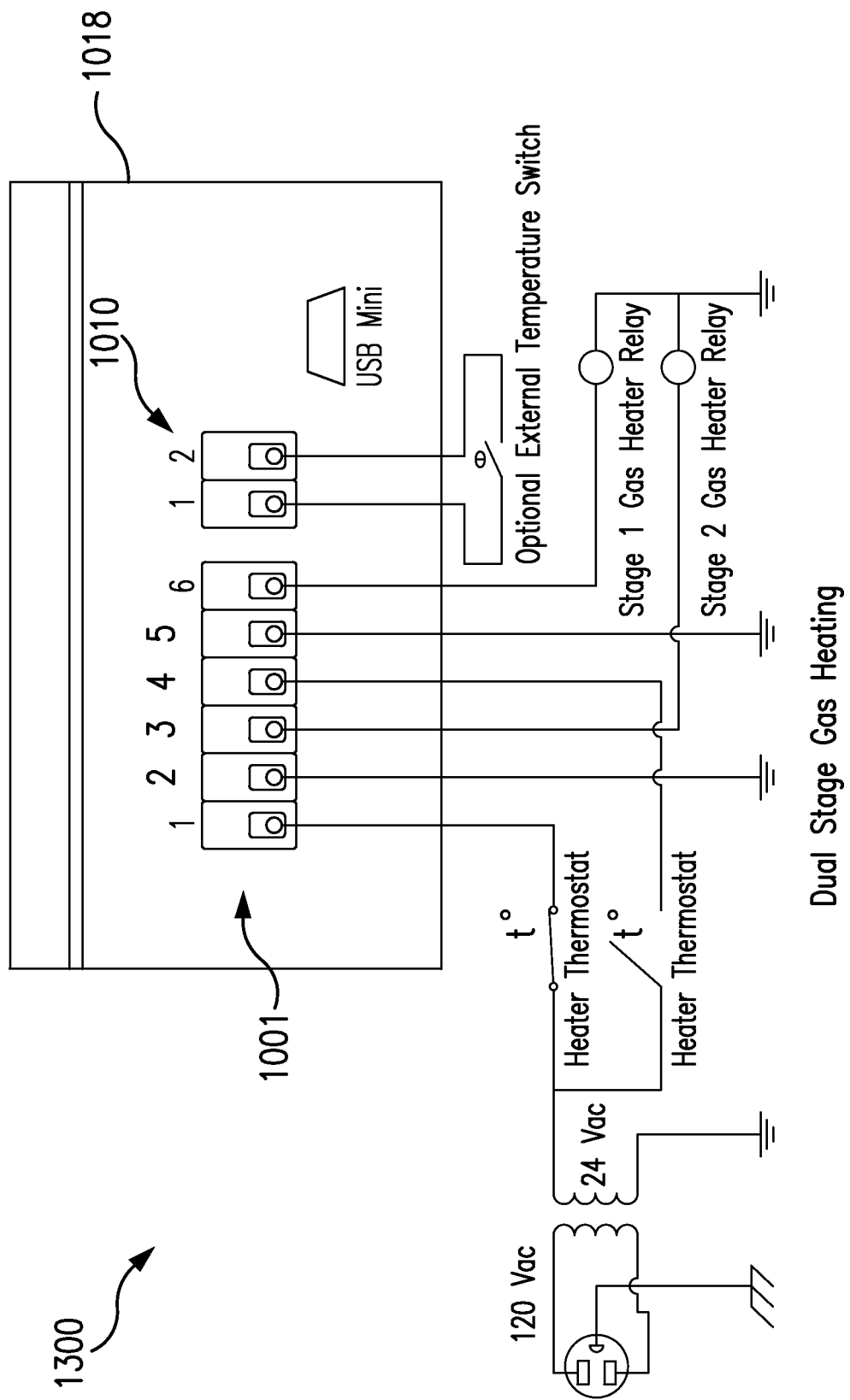
FIG. 12 is an electrical connection diagram for a dual stage gas heating application using the electronic controller according to an example of the present invention, wherein this configuration is shown as used when dual thermostats are used to control a dual stage gas heating device.

FIG. 12 shows an electrical connection diagram 1300 for a dual stage gas heating application using an electronic controller according to an example of the present invention. The wiring termination for this configuration is presented in the figure. This configuration can be used when a single thermostat is used to control a dual stage gas heating device. This configuration also supports thermostats that provide a manual switch to select either heating or cooling operation.

Figure 13:
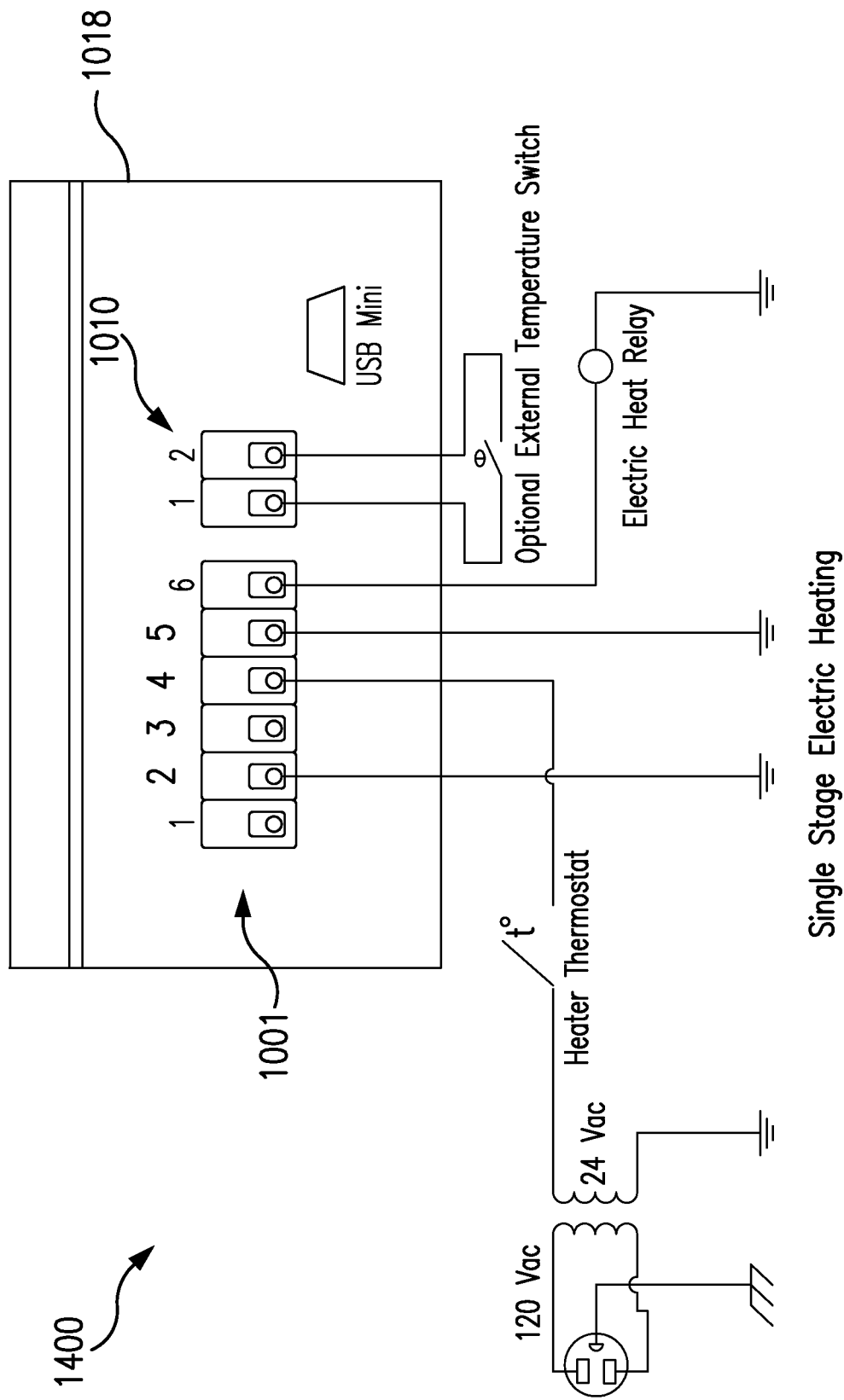
FIG. 13 is an electrical connection diagram for a single stage electric heating application using the electronic controller according to an example of the present invention, wherein this configuration is shown as used when a single thermostat is used to control one single stage electric heating device.

FIG. 13 shows an electrical connection diagram 1400 for a single stage electric heating application using an electronic controller according to an example of the present invention. The wiring termination for this configuration is presented in the figure. This configuration can be used when a single thermostat is used to control one single stage electric heating device. This configuration also supports thermostats that provide a manual switch to select either heating or cooling operation.

Figure 14:
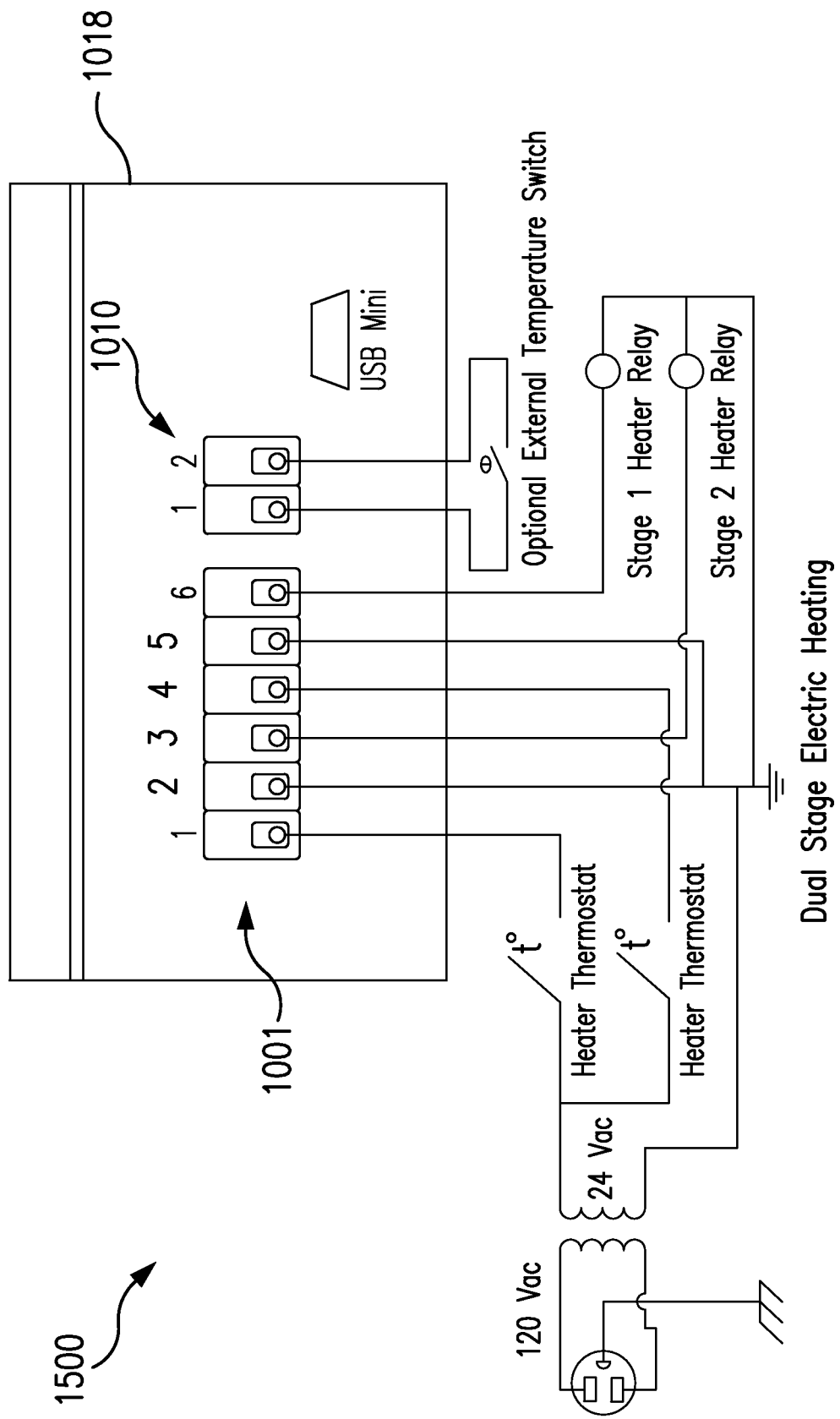
FIG. 14 is an electrical connection diagram for a dual stage electric heating application using the electronic controller according to an example of the present invention, wherein this configuration is shown as used when dual thermostats are used to control a dual stage electric heating device.

FIG. 14 shows an electrical connection diagram 1500 for a dual stage electric heating application using an electronic controller according to an example of the present invention. The wiring termination for this configuration is presented in the figure. This configuration can be used when a single thermostat is used to control a dual stage electric heating device. This configuration is used when a single thermostat is used to control a dual stage electric heating device. This configuration also supports thermostats that provide a manual switch to select either heating or cooling operation.

Figure 15:
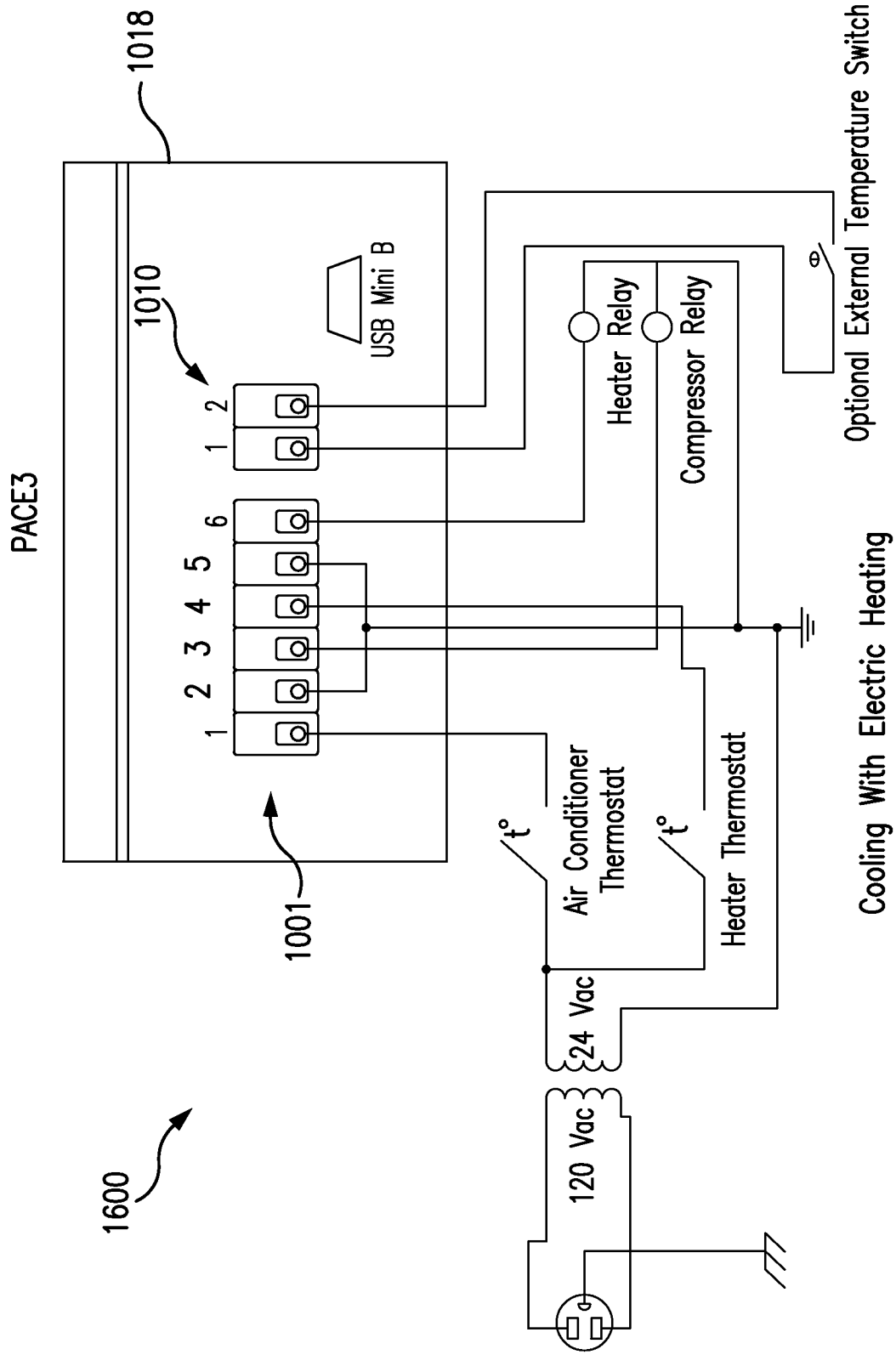
FIG. 15 is an electrical connection diagram for a cooling with electric heating application using the electronic controller according to an example of the present invention, wherein this configuration is shown as used when a dual thermostat is used to control an air conditioner compressor and an electric heating device.

FIG. 15 shows an electrical connection diagram 1600 for a cooling with electric heating application using an electronic controller according to an example of the present invention. The wiring termination for this configuration is presented in the figure. This configuration can be used when a dual thermostat is used to control an air conditioner compressor and an electric heating device. This configuration also supports thermostats that provide a manual switch to select either heating or cooling operation. The controller 1018 may be controlled remotely with an input from a BMS or other similar system (not shown). If this feature is required, the "dry contact" input 1010 is used. FIG. 15 also includes the wiring terminations for connecting an optional external temperature sensor to the dry contact inputs.

Figure 16:
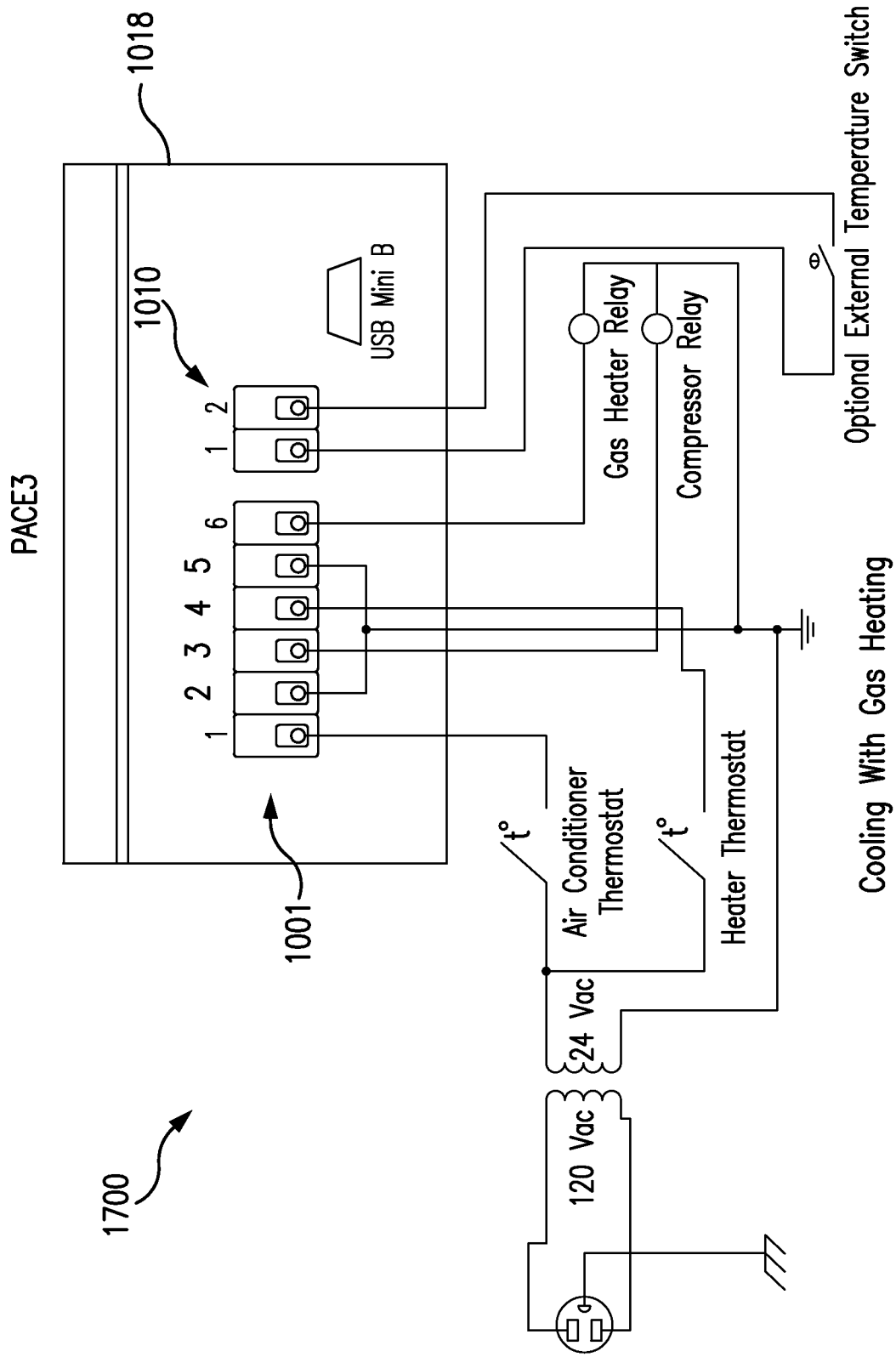
FIG. 16 is an electrical connection diagram for a cooling with gas heating application using the electronic controller according to an example of the present invention, wherein this configuration is shown as used when a dual thermostat is used to control an air conditioner compressor and a gas heating device, either forced hot air or hydronic.

FIG. 16 shows an electrical connection diagram 1700 for a cooling with gas heating application using an electronic controller according to an example of the present invention. The wiring termination for this configuration is presented in the figure. This configuration can be used when a dual thermostat is used to control an air conditioner compressor and a gas heating device. This configuration also supports thermostats that provide a manual switch to select either heating or cooling operation. The controller 1018 may be controlled remotely in this configuration with an input from a BMS or other similar system (not shown). As with the configuration of FIG. 15, if this feature is required, the "dry contact" input is used. FIG. 16 includes the wiring terminations for connecting an optional external temperature sensor to the dry contact inputs.

Figure 17:
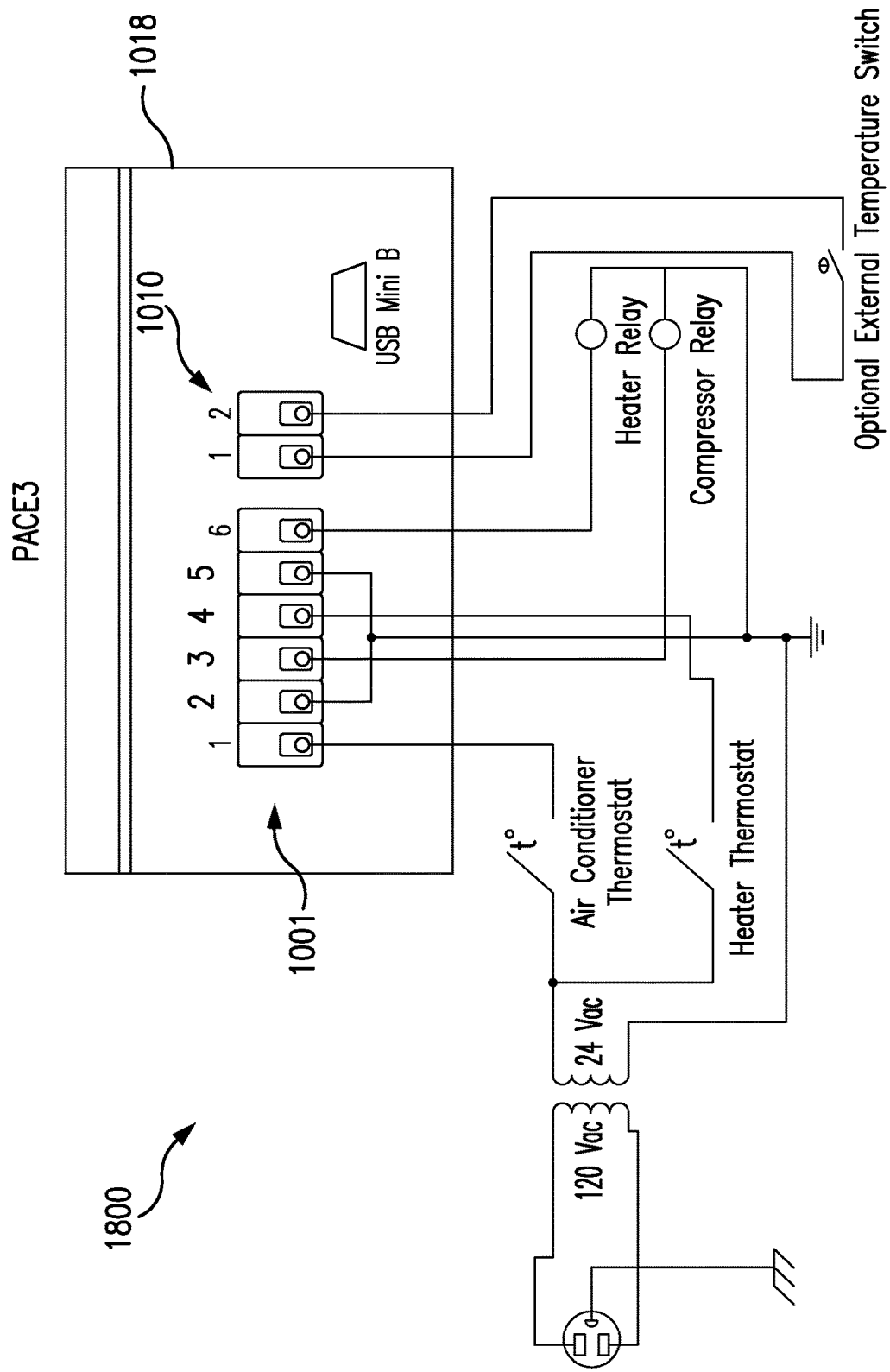
FIG. 17 is an electrical connection diagram for a heat pump with electric heating application using the electronic controller according to an example of the present invention, wherein this configuration is shown as used when a dual thermostat is used to control a heat pump compressor with an auxiliary electric heating device. The "Optional External Temperature Switch" is attached to the evaporator discharge to sense when the unit is operating in cooling or heating modes.

FIG. 17 is an electrical connection diagram 1800 for a heat pump with electric heating application using an electronic controller according to an example of the present invention. The wiring termination for this configuration is presented in the figure. This configuration can be used when a dual thermostat is used to control a heat pump compressor with an auxiliary electric heating device. This configuration also supports thermostats that provide a manual switch to select either heating or cooling operation. The controller 1018 may be controlled remotely in this configuration with an input from a BMS or other similar system (not shown). As with the configurations of FIGS. 15 and 16, if this feature is required, the "dry contact" input is used. FIG. 17 includes the wiring terminations for connecting an optional external temperature sensor to the dry contact inputs.

Figure 18:
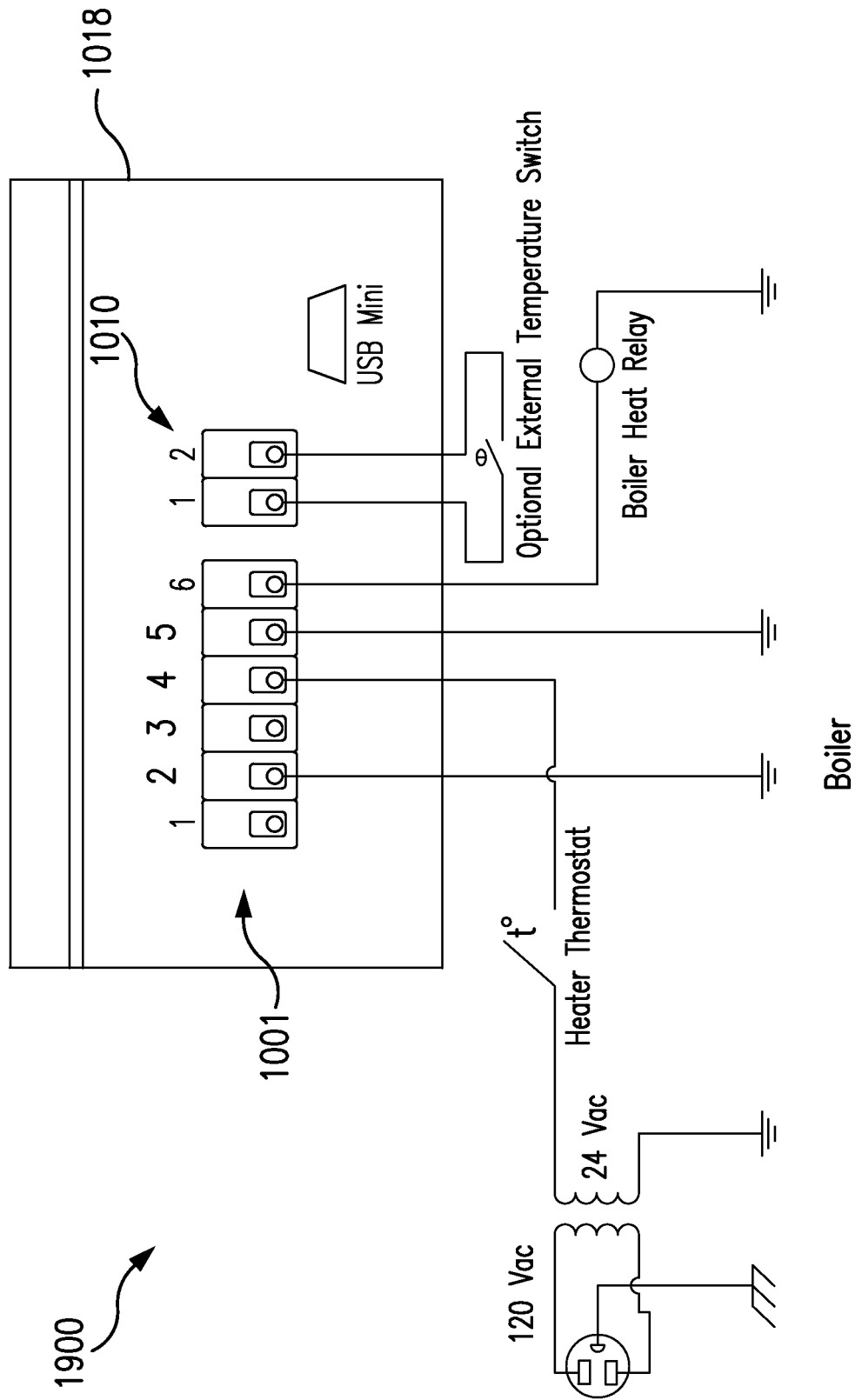
FIG. 18 is an electrical connection diagram for a boiler application using the electronic controller according to an example of the present invention, wherein this configuration is shown as used when a single thermostat is used to control one single stage boiler heating device.

FIG. 18 shows an electrical connection diagram 1900 for a boiler application using an electronic controller according to an example of the present invention. The wiring termination for this configuration is presented in the figure. This configuration can be used when a single thermostat is used to control one single stage boiler heating device.

In these manners, for example, an electronic controller having the indicated delayed start controller, demand regulator controller, excess time controller, and excess cycle controller programs is operable to intercept and process a thermostat's control signal with an algorithm that can automatically generate enhanced control signals. Amongst other benefits and advantages, existing HVACR systems, for example, can embody the present controller such as illustrated herein to improve energy consumption and reduce energy costs of heating, cooling, and refrigeration equipment.

The present invention includes the following aspects/embodiments/features in any order and/or in any combination:

1. The present invention relates to an electronic controller device for automatic control of a heating, ventilating, air conditioning or refrigeration (HVACR) system, comprising:
   at least one input connector for attaching at least one thermostat signal line and at least one output connector for attaching at least one signal line for outputting a control signal from the controller device to a load unit, wherein the controller device is capable of intercepting a thermostat command for a load unit of the HVACR system;
   a delayed start controller that is capable of delaying sending of a signal to power on a load unit and achieve a selected conditioned space temperature variation; and
   a demand regulator controller that is capable of calculating on times and off times to obtain a selected electrical demand.

2. The electronic controller device of any preceding or following embodiment/feature/aspect, wherein the controller device is capable of intercepting a thermostat command for at least one of a compressor, blower, or heater.

3. The electronic controller device of any preceding or following embodiment/feature/aspect, comprising a computer-readable storage medium, a programmable microprocessor, and a real time clock, wherein the delayed start controller and demand regulator controller are stored as programs in the computer-readable storage medium and are executable on the microprocessor, and the controller device operable to record OEM power ON times with reference made to the real time clock.

4. The electronic controller device of any preceding or following embodiment/feature/aspect, wherein the delayed start controller that is capable of delaying sending of a signal to start a load unit wherein an OEM temperature deadband setting of a thermostat is multiplied by a selected factor having a numerical value of 1 or more to obtain a zone temperature deadband which replaces the OEM temperature deadband.

5. The electronic controller device of any preceding or following embodiment/feature/aspect, wherein the demand regulator controller is capable of setting controller off time values to a fixed value and adjusting controller on time values to satisfy a selected electrical demand set point between 100% and 0% demand.

6. The electronic controller device of any preceding or following embodiment/feature/aspect, further comprising at least one of an excess time controller and an excess cycle controller.

7. The electronic controller device any preceding or following embodiment/feature/aspect, further comprising a signal generator capable of generating a control signal based at least in part on application of a signal processing algorithm to a thermostat command intercepted by the electronic controller device, as performed at least in part with the delayed start controller and demand regulator controller.

8. The present invention relates to a heating, ventilating, air conditioning or refrigeration (HVACR) system comprising a heating, ventilating, air conditioning or refrigeration unit and the electronic controller device of claim 1 that intercepts a thermostat control signal of the HVACR system and applies an algorithm thereto to generate an output control signal for a load unit of the HVACR system.

9. The present invention relates to a system for automatic control of an HVACR system, comprising:
   a thermostat;
   an electronic controller device, and
   at least one of load unit operably connected to a power supply line, wherein
   the electronic controller device comprising a) at least one input connector for attaching at least one thermostat signal line and at least one output connector for attaching at least one signal line for outputting a control signal from the controller device to a load unit, wherein the controller device is capable of intercepting a thermostat command for a load unit of the HVACR system, b) a delayed start controller that is capable of delaying sending of a signal to power on a load unit and achieve a selected conditioned space temperature variation, and c) a demand regulator controller that is capable of calculating on times and off times to obtain a selected electrical demand.

10. The system of any preceding or following embodiment/feature/aspect, wherein multiple load units of the HVACR system are concurrently controlled with the electronic controller.

11. The system of any preceding or following embodiment/feature/aspect, further comprising a signal generator capable of generating a control signal based at least in part on application of a signal processing algorithm to a thermostat command intercepted by the electronic controller device, as performed at least in part with the delayed start controller and demand regulator controller.

12. The system of any preceding or following embodiment/feature/aspect, wherein an algorithm incorporating at least the delayed start controller and the demand regulator controller is added to thermostat software of the thermostat, or Building Management System (BMS) software where a BMS provides control to the at least one load unit.

13. The present invention relates to a method for automatically controlling and managing power usage and/or load demand and operation of at least one load unit powered by electricity in an HVACR system, comprising the steps of:

electrically connecting a controller device in a control signal line between a thermostat for a load unit and an equipment load control switch for the load unit, wherein the controller device comprising a) at least one input connector for attaching at least one thermostat signal line and at least one output connector for attaching at least one signal line for outputting a control signal from the controller device to a load unit, wherein the controller device is capable of intercepting a thermostat command for a load unit of the HVACR system, b) a delayed start controller that is capable of delaying sending of a signal to power on a load unit and achieve a selected conditioned space temperature variation, and c) a demand regulator controller that is capable of calculating on times and off times to obtain a selected electrical demand;

intercepting at least one thermostat command from the thermostat for cooling, refrigeration, or heating at the controller device;

applying an algorithm by the electronic controller to the intercepted thermostat command to generate an adjusted control signal or allow the OEM signal as an output signal;

outputting the output signal generated by the controller device to a load unit switch to control operation of the load unit; and e) estimating the energy consumption and/or the demand consumption savings.

14. The method of any preceding or following embodiment/feature/aspect, wherein the load unit of the HVACR system comprises a compressor, a blower, a gas heater, an electric heater, or a boiler.

15. The method of any preceding or following embodiment/feature/aspect, wherein multiple load units of the HVACR system are concurrently controlled with the electronic controller.

The present invention can include any combination of these various features or embodiments above and/or below as set forth in sentences and/or paragraphs. Any combination of disclosed features herein is considered part of the present invention and no limitation is intended with respect to combinable features.

The present invention will be further clarified by the following examples, which are intended to be exemplary of the present invention.

EXAMPLE 1

Performance was evaluated as follows. A simulation of an operation of a single stage cooling system, wherein a single thermostat is used to control one compressor, such as shown in FIG. 9, with the electronic controller, and without the electronic controller (OEM control alone), was performed. The simulation was performed on a computer model that was developed using VisSim software, obtained from Visual Solutions of Westford, Mass., USA. The developed program was adapted to simulate operation of the electronic controller that applies the process control logic shown in FIGS. 3-8 herein, and the OEM thermostat control operating alone (without the electronic controller). The developed model was based in part on actual data obtained from operation of the same equipment in the indicated single stage cooling configuration and with the OEM thermostat alone in the field. The simulation model is calibrated to agree with field data.

Figure 19:
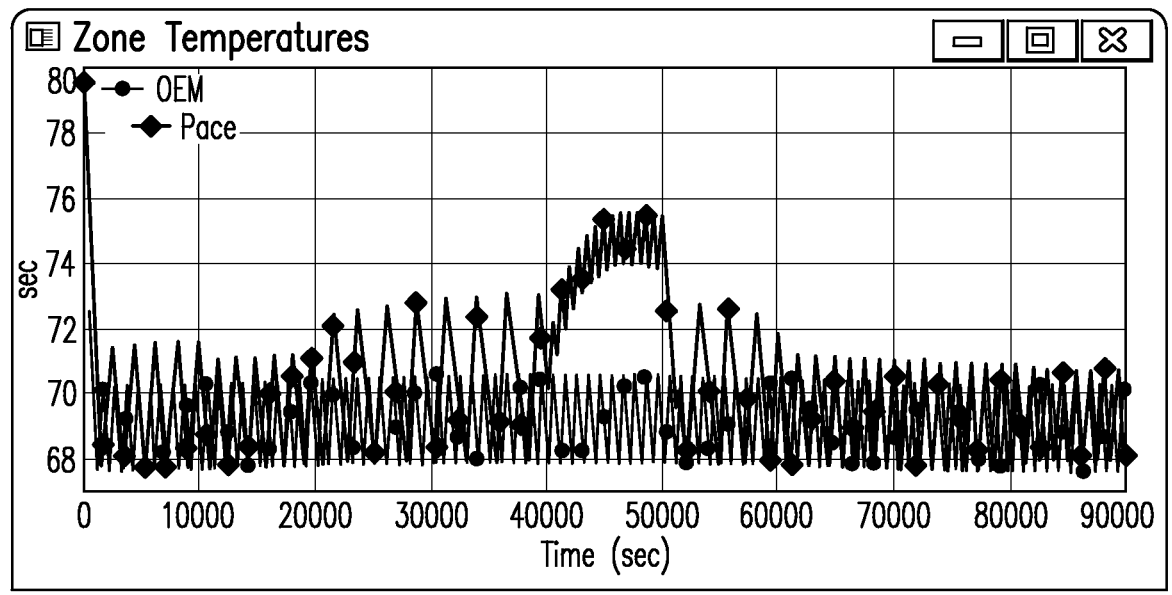
FIG. 19 is a plot showing conditioned space (zone) temperature (° F.) over a period time for a simulated control of a load device in a cooling application of a HVACR system with an OEM controller (thermostat) and separately with the electronic controller according to an example of the present invention.

The ability of the electronic controller to obey the Factor Setpoint is presented in terms of temperature regulation in the history plot shown in FIG. 19. Factor Setpoint was initially set at 2.7, Demand Setpoint at 0.8, and Equipment Starts Per Hour to 7. A Factor setting of 2.7 means that the target Zone Temperature should vary across a deadband of 2.7*2 degrees=5.4 degrees, during this time the simulated Zone Temperature varies between 68 and 71.75 degrees or 3.75 degrees deadband which is acceptable. At time 10000 seconds, the Factor Setpoint was reduced to 1.5 (which corresponds to a Zone temperature variation of 3 degrees, the simulated variation was from 68 to 71 degrees or 3 degrees), then increased back to 2.7 at time 20000 seconds and then decreased back to 1.5 at time 60000 seconds. These temperature degrees all can refer to ° F.

Figure 20:
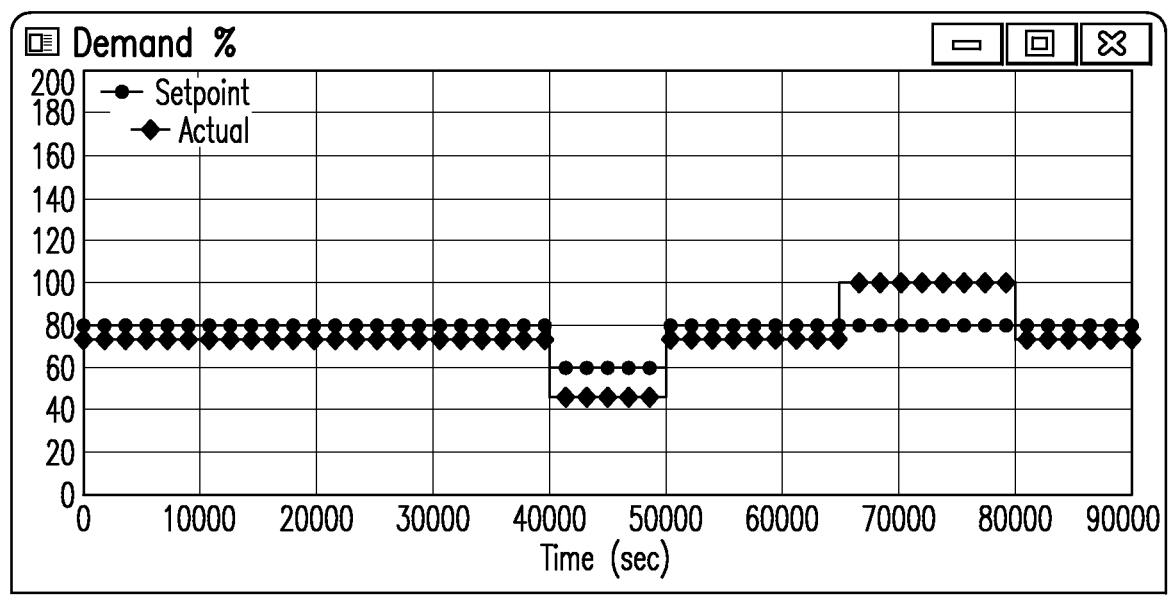
FIG. 20 is a plot showing the demand (%), which represents energy consumption, with respect to demand set point over a period time for the simulated control indicated for FIG. 19 of the load device of a HVACR system with an OEM controller (thermostat) and separately with the electronic controller according to an example of the present invention.

The ability of the electronic controller to obey the Demand Setpoint is presented in terms of temperature regulation in the history plot shown in FIG. 20. Demand Setpoint was decreased to 60% at time 40000 seconds and then increased back to 80% at time 50000 seconds. Demand setpoint tracking is acceptable, however, between times 65000 and 80000 seconds, the Demand Setpoint could not be achieved because the "ON" and "OFF" times were in a limited state of operation (these limits are configurable but are in place to prevent damage to the equipment). Also, there is an adverse effect on temperature as the Demand Setpoint is decreased as seen in the upper right time history plot between times 40000 and 50000 seconds. As the Demand Setpoint is decreased, the equipment will run less frequently and the conditioned space temperature will increase.

FIG. 20 presents the demand tracking performance of the DR controller.

Figure 21:
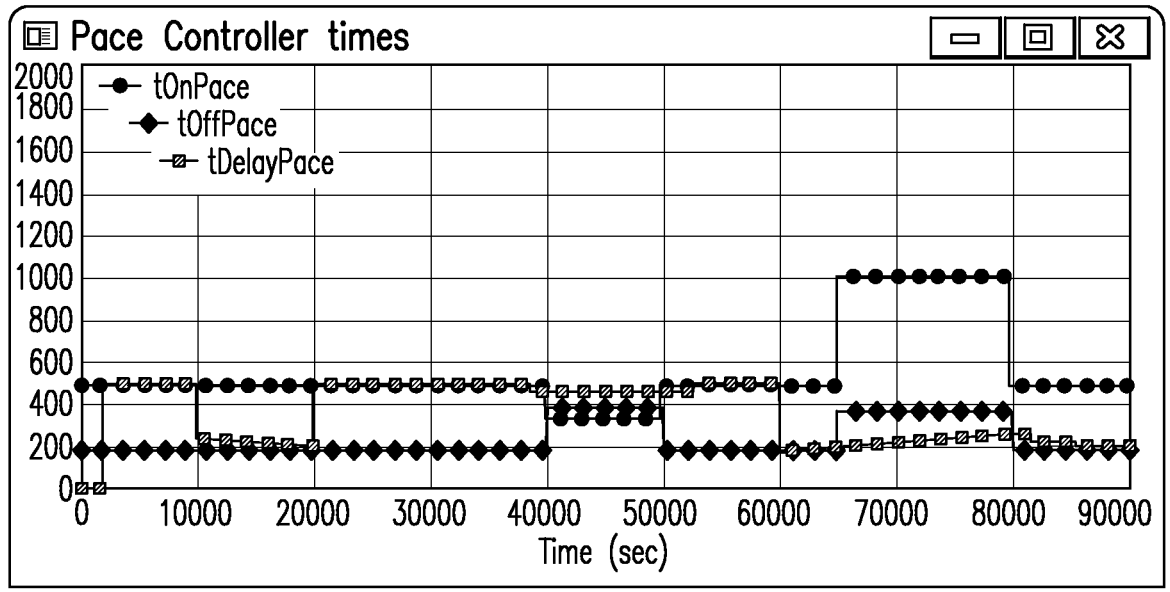
FIG. 21 is a plot showing the controller off times, on times, and delay time for the simulated control indicated for FIG. 19 of the load device of a HVACR system with the electronic controller according to an example of the present invention.

The plot shown in FIG. 21 presents the time delay (tDelayPace) calculated by the DS controller, and "on" and "off" times (tOnPace and tOffPace) calculated by the DR controller as the Demand Setpoint and Factor Setpoint were varied.

Figure 23:
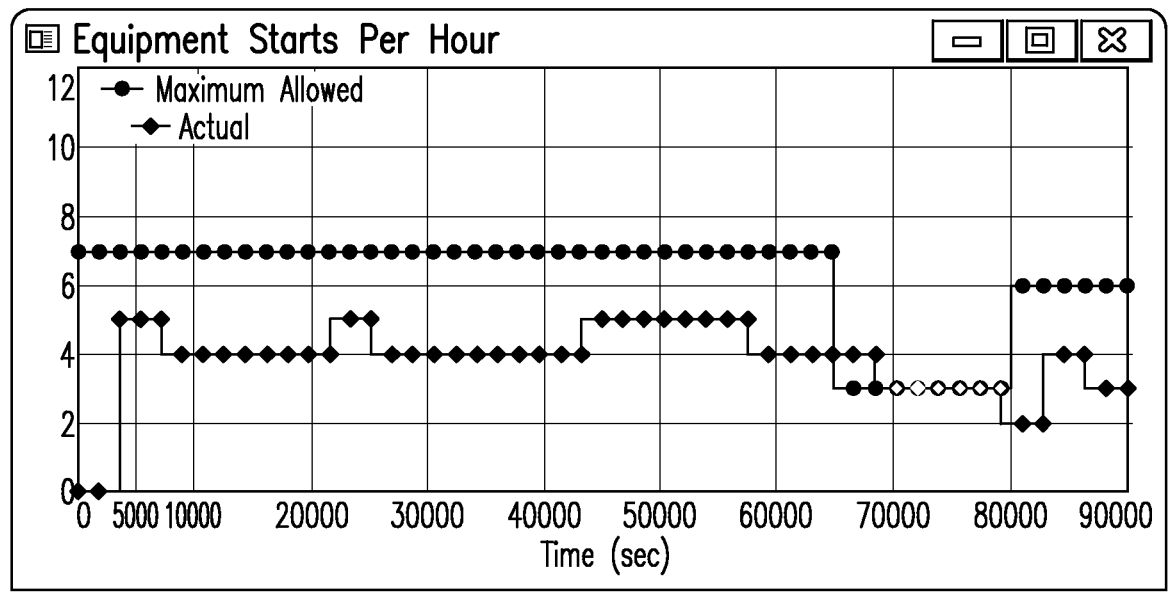
FIG. 23 is a plot showing maximum allowed and actual equipment starts per hour for the simulated control indicated for FIG. 19 of the load device of a HVACR system with the electronic controller according to an example of the present invention.

The equipment starts per hour is shown in the time history shown in FIG. 23. Starts per hour is fixed at 7 until time 65000 seconds, where it is decreased to 3 and then back to 6 at time 80000 seconds. The controller is designed to not exceed the Maximum allowed equipment starts per hour.

Figure 22:
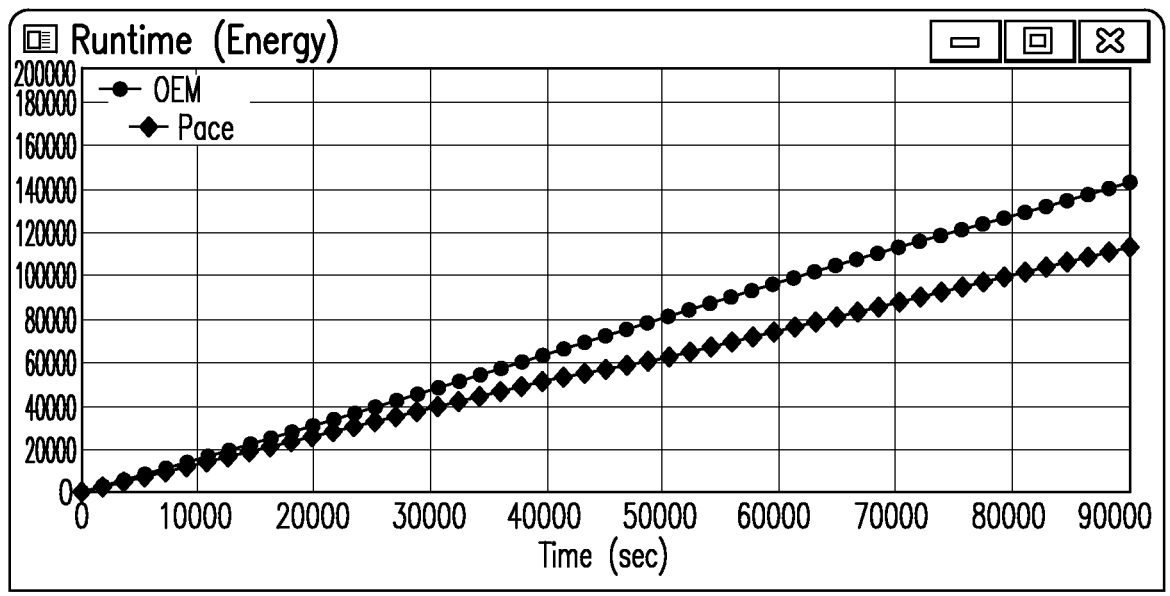
FIG. 22 is a plot showing scaled runtime energy consumption for the simulated control indicated for FIG. 19 of the load device of a HVACR system with an OEM controller (thermostat) and separately with the electronic controller according to an example of the present invention.

FIG. 22 shows the energy consumption of the compressor and blower under control by this invention compared to an OEM control working on identical equipment in identical load conditions.

FIG. 23 shows the compressor starts per hour and is self-explanatory.

Figure 24:
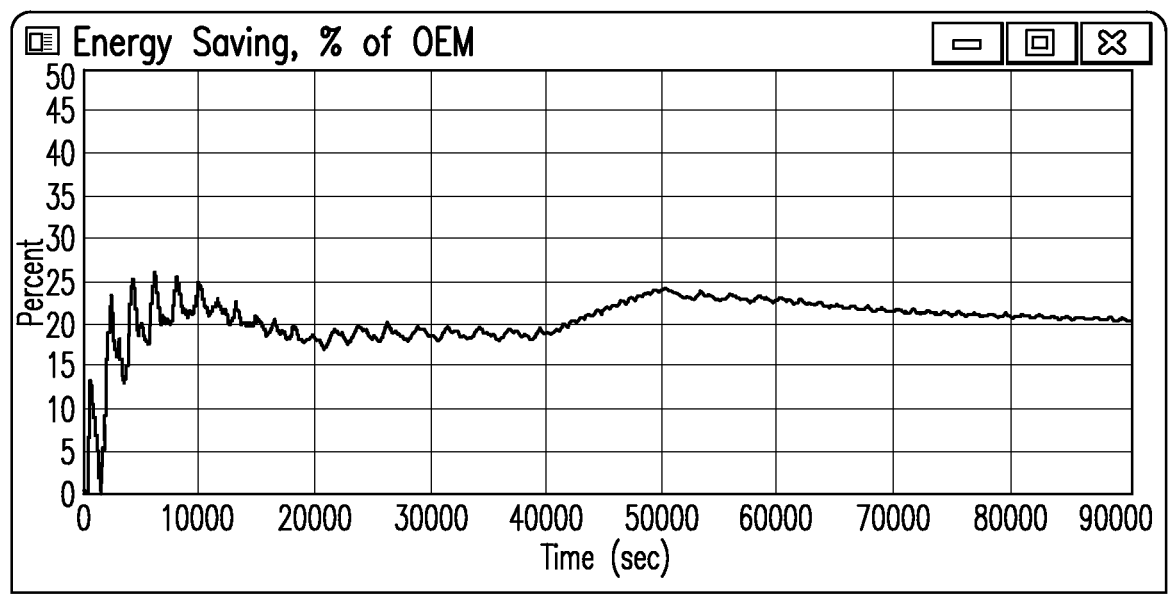
FIG. 24 is a plot showing the energy savings, as a percentage (%) of the OEM energy requirements for similar operational time periods, for the simulated control indicated for FIG. 19 of the load device of a HVACR system with the electronic controller according to an example of the present invention.

FIG. 24 is a plot showing the energy savings, as a normalized percentage (%) of the OEM energy requirements for similar operational time periods, for the simulated control indicated for FIG. 19 of the load device of a HVACR system with an electronic controller according to an example of the present invention. The energy savings for this illustration are about 20%.

The entire contents of all references cited in this disclosure are incorporated herein in their entireties, by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. An electronic controller device for automatic control of a heating, ventilating, air conditioning or refrigeration (HVACR) system, comprising:
   at least one input connector for attaching at least one thermostat signal line and at least one output connector for attaching at least one signal line for outputting a control signal from the electronic controller device to a load unit, wherein the electronic controller device intercepts a thermostat command for the load unit of the HVACR system;
   a delayed start controller that delays sending a signal to power on the load unit and achieves a selected conditioned space temperature variation, wherein an original equipment manufacturer (OEM) temperature deadband setting of a thermostat is multiplied by a selected factor having a numerical value of 1 or more to obtain a time delay value;
   a demand regulator controller that calculates on times and off times to obtain a selected electrical demand while maintaining conditioned space temperature variations, wherein the demand regulator controller periodically turns off the load unit to adjust a time period needed to provide a temperature adjustment back to a set point;
   a signal generator that generates the control signal as a binary modulated signal, wherein the binary modulated signal is obtained based at least in part on application of a signal processing algorithm to the thermostat command intercepted by the electronic controller device, wherein the signal processing algorithm is performed at least in part with reference made to a load unit activation delay time calculated by the delayed start controller and on times and off times to achieve a demand set point calculated by the demand regulator controller;
   an excess time controller, wherein the excess time controller alters the demand set point when the electronic controller device is in a continuous run state; and
   a computer-readable storage medium, a programmable microprocessor, and a real time clock, wherein the delayed start controller and demand regulator controller are stored as programs in the computer-readable storage medium and are executable on the microprocessor, and the electronic controller device operable to record OEM power ON times of ON/OFF control of the load unit by an OEM thermostat with reference made to the real time clock,
   wherein the electrical demand is calculated as a total on time during a 15 minute interval.

2. The electronic controller device of claim 1, wherein the electronic controller device intercepts the thermostat command for at least one of a compressor, blower, or heater.

3. The electronic controller device of claim 1, wherein the demand regulator controller sets off time values to a fixed value and adjusting on time values to satisfy a selected electrical demand set point between 100% and 0%.

4. A heating, ventilating, air conditioning or refrigeration (HVACR) system comprising a load unit selected from a heating, ventilating, air conditioning or refrigeration unit and said electronic controller device of claim 1 that intercepts a thermostat control signal for the load unit of said HVACR system and applies an algorithm thereto to generate a control signal, wherein the electronic controller device has at least one output connector attached to at least one signal line for outputting the control signal to the load unit of the HVACR system.

5. A system for automatic control of a heating, ventilating, air conditioning or refrigeration (HVACR) system, comprising:
   a thermostat;
   an electronic controller device, and
   at least one load unit operably connected to a power supply line, wherein
   the electronic controller device comprising a) at least one input connector for attaching at least one thermostat signal line and at least one output connector for attaching at least one signal line for outputting a control signal from the electronic controller device to the at least one load unit, wherein the electronic controller device intercepts a thermostat command for the at least one load unit of the HVACR system, b) a delayed start controller that delays sending of a signal to power on the at least one load unit and achieve a selected conditioned space temperature variation wherein an original equipment manufacturer (OEM) temperature deadband setting of a thermostat is multiplied by a selected factor having a numerical value of 1 or more to obtain a time delay value, c) a demand regulator controller that calculates on times and off times to obtain a selected electrical demand while maintaining conditioned space temperature variations, wherein the demand regulator controller periodically turns off the at least one load unit to adjust a time period needed to provide a temperature adjustment back to a set point; d) a signal generator that generates the control signal as a binary modulated signal, wherein the binary modulated signal is obtained based at least in part on application of a signal processing algorithm to the thermostat command intercepted by the electronic controller device, wherein the signal processing algorithm is performed at least in part with reference made to a load unit activation delay time calculated by the delayed start controller and on times and off times to achieve a demand set point calculated by the demand regulator controller;
   an excess time controller, wherein the excess time controller alters the demand set point when the electronic controller device is in a continuous run state; and
   a computer-readable storage medium, a programmable microprocessor, and a real time clock, wherein the delayed start controller and demand regulator controller are stored as programs in the computer-readable storage medium and are executable on the microprocessor, and the electronic controller device operable to record OEM power ON times of ON/OFF control of the at least one load unit by an OEM thermostat with reference made to the real time clock, wherein the electrical demand is calculated as a total on time during a 15 minute interval.

6. The system of claim 5, wherein multiple load units of the HVACR system are concurrently controlled with the electronic controller.

7. The system of claim 5, wherein an algorithm incorporating at least the delayed start controller and the demand regulator controller is added to thermostat software of the thermostat, or Building Management System (BMS) software where a BMS provides control to the at least one load unit.

8. A method for automatically controlling and managing power usage, load demand, or both, and operation of at least one load unit powered by electricity in a heating, ventilating, air conditioning or refrigeration (HVACR) system, comprising steps of:

a) electrically connecting an electronic controller device in a control signal line between a thermostat for the at least one load unit for cooling, refrigeration, or heating and a load control switch for the at least one load unit, wherein the electronic controller device comprises at least one input connector for attaching at least one thermostat signal line and at least one output connector for attaching at least one signal line for outputting a control signal from the electronic controller device to the at least one load unit, wherein the electronic controller device intercepts at least one thermostat command from a thermostat for the at least one load unit of the HVACR system, a delayed start controller that delays sending of a signal to power on the at least one load unit and achieve a selected conditioned space temperature variation wherein an original equipment manufacturer (OEM) temperature deadband setting of a thermostat is multiplied by a selected factor having a numerical value of 1 or more to obtain a time delay value, a demand regulator controller that calculates on times and off times to obtain a selected electrical demand while maintaining conditioned space temperature variations, wherein the demand regulator controller periodically turns off the at least one load unit to adjust a time period needed to provide a temperature adjustment back to a set point; a signal generator that generates the control signal as a binary modulated signal, wherein the binary modulated signal is obtained based at least in part on application of a signal processing algorithm to the at least one thermostat command intercepted by the electronic controller device, wherein the signal processing algorithm is performed at least in part with reference made to a load unit activation delay time calculated by the delayed start controller and on times and off times to achieve a demand set point calculated by the demand regulator controller; an excess time controller, wherein the excess time controller alters the demand set point when the electronic controller device is in a continuous run state; and a computer-readable storage medium, a programmable microprocessor, and a real time clock, wherein the delayed start controller and demand regulator controller are stored as programs in the computer-readable storage medium and are executable on the microprocessor, and the electronic controller device operable to record OEM power ON times of ON/OFF control of the at least one load unit by an OEM thermostat with reference made to the real time clock;

b) intercepting the at least one thermostat command comprising an OEM signal from the thermostat at the electronic controller device before the OEM signal is received at the load control switch;

c) applying an algorithm by the electronic controller to the intercepted at least one thermostat command to generate an adjusted control signal as an output signal or allow the OEM signal as an output signal;

d) outputting the adjusted output signal generated or the OEM signal allowed by the controller device to the at least one load unit switch to control operation of the at least one load unit; and e) estimating an energy consumption, a demand consumption savings, or both.

9. The method of claim 8, wherein the at least one load unit of the HVACR system comprises a compressor, a blower, a gas, oil, electric heater, or a boiler.

10. The method of claim 8, wherein multiple load units of the HVACR system are concurrently controlled with the electronic controller.

11. The electronic controller device of claim 1, wherein the demand regulator controller periodically turns off the load unit to increase the time period needed to provide the temperature adjustment back to the set point.

12. The system of claim 5, wherein the demand regulator controller periodically turns off the load unit to increase the time period needed to provide the temperature adjustment back to the set point.

13. The method of claim 8, wherein the demand regulator controller periodically turns off the load unit to increase the time period needed to provide the temperature adjustment back to the set point.

14. The electronic controller device of claim 1, wherein the delayed start controller delays a sending of a signal to start the load unit of a zone temperature deadband which replaces the OEM temperature deadband.

* * * * *